United States Patent
Akkarakaran et al.

(10) Patent No.: US 10,848,363 B2
(45) Date of Patent: Nov. 24, 2020

(54) FREQUENCY DIVISION MULTIPLEXING FOR MIXED NUMEROLOGY

(71) Applicant: QUALCOMM Incorporated, San Diego, CA (US)

(72) Inventors: Sony Akkarakaran, Poway, CA (US); Tao Luo, San Diego, CA (US); Wanshi Chen, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 69 days.

(21) Appl. No.: 16/184,853

(22) Filed: Nov. 8, 2018

(65) Prior Publication Data

US 2019/0140881 A1    May 9, 2019

Related U.S. Application Data

(60) Provisional application No. 62/584,108, filed on Nov. 9, 2017.

(51) Int. Cl.
*H04L 27/26* (2006.01)
*H04W 16/28* (2009.01)
(Continued)

(52) U.S. Cl.
CPC .......... *H04L 27/2675* (2013.01); *H04J 3/00* (2013.01); *H04L 5/001* (2013.01); *H04L 5/0048* (2013.01);
(Continued)

(58) Field of Classification Search
CPC ... H04L 5/001; H04L 5/0048; H04L 27/2675; H04L 27/2613; H04L 27/2657;
(Continued)

(56) References Cited

U.S. PATENT DOCUMENTS

2012/0076028 A1  3/2012  Ko et al.
2017/0126439 A1  5/2017  Yoshimoto et al.
(Continued)

FOREIGN PATENT DOCUMENTS

EP            3122107 A1   1/2017
WO   WO-2011088403 A1    7/2011

OTHER PUBLICATIONS

International Search Report and Written Opinion—PCT/US2018/060156—ISA/EPO—dated Apr. 11, 2019.

*Primary Examiner* — Rownak Islam
(74) *Attorney, Agent, or Firm* — Holland & Hart LLP

(57) ABSTRACT

A base station may utilize frequency division multiplexing (FDM) techniques to signal synchronization signal (SS) blocks and downlink transmissions (e.g., data/control transmissions). The base station may configure a configuration for a bandwidth part (BWP) of a carrier for downlink transmissions. The BWP configuration may include a transmission attribute (e.g., a subcarrier spacing (SCS)) for downlink transmissions within the BWP. The base station may transmit a grant for a downlink transmission to a user equipment (UE). In some cases, the downlink transmission may be scheduled for a set of resources that overlap in time with a SS block for the carrier. The base station may transmit downlink transmissions within the BWP using transmission attributes configured for the BWP and/or using SS block transmission attributes, depending on capabilities of the UE, on whether the time resources of the downlink transmission that are FDMed with the SS block, etc.

38 Claims, 18 Drawing Sheets

(51) Int. Cl.
  *H04W 56/00* (2009.01)
  *H04W 72/14* (2009.01)
  *H04L 5/00* (2006.01)
  *H04W 72/04* (2009.01)
  *H04W 8/24* (2009.01)
  *H04J 3/00* (2006.01)
  *H04L 7/00* (2006.01)

(52) U.S. Cl.
  CPC ...... *H04L 27/2613* (2013.01); *H04L 27/2657* (2013.01); *H04L 27/2666* (2013.01); *H04L 27/2692* (2013.01); *H04W 8/24* (2013.01); *H04W 16/28* (2013.01); *H04W 56/001* (2013.01); *H04W 72/042* (2013.01); *H04W 72/14* (2013.01); *H04L 7/00* (2013.01); *H04W 72/046* (2013.01); *H04W 72/0453* (2013.01)

(58) Field of Classification Search
  CPC ... H04L 27/2692; H04L 27/2666; H04L 7/00; H04W 72/042; H04W 72/0453; H04W 72/046; H04W 56/001; H04W 72/14; H04W 16/28; H04W 8/24; H04J 3/00; H04J 1/0037; H04J 1/00
  USPC ......................................................... 370/329
  See application file for complete search history.

(56) References Cited

U.S. PATENT DOCUMENTS

| | | | |
|---|---|---|---|
| 2019/0045571 A1* | 2/2019 | Wu | H04L 5/0048 |
| 2019/0069256 A1* | 2/2019 | Jung | H04L 5/005 |
| 2020/0053671 A1* | 2/2020 | Kim | H04L 5/0007 |
| 2020/0059930 A1* | 2/2020 | Lee | H04W 72/0453 |

* cited by examiner

US 10,848,363 B2

FREQUENCY DIVISION MULTIPLEXING FOR MIXED NUMEROLOGY

CROSS REFERENCES

The present application for patent claims benefit of U.S. Provisional Patent Application No. 62/584,108 by Akkarakaran, et al., entitled "Frequency Division Multiplexing For Mixed Numerology," filed Nov. 9, 2017, assigned to the assignee hereof, and expressly incorporated by reference in its entirety.

BACKGROUND

The following relates generally to wireless communication, and more specifically to frequency division multiplexing (FDM) for bandwidth part (BWP) transmissions with mixed attributes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiple access (DFT-s-OFDM). A wireless multiple-access communications system may include a number of base stations or network access nodes, each simultaneously supporting communication for multiple communication devices, which may be otherwise known as user equipment (UE).

In some wireless communications systems (e.g., systems supporting millimeter wave (mmW) communications), beamforming may be used in order to overcome the relatively high path losses associated with frequencies in these systems. In order to support beamformed transmissions, communicating wireless devices (e.g., a base station and UE) may be operable to discover and maintain suitable beams for a given communication link via synchronization signals. The synchronization signals may be transmitted in synchronization signal (SS) blocks, which may also be used, for example, for cell acquisition procedures, cell timing synchronization, etc. Further, in such wireless communications systems, connections may be established using a relatively wide channel frequency bandwidth. In some cases, one or more portions of the channel frequency bandwidth, referred to as BWPs, may be used for communications with a UE. In such cases, if a relatively small amount of data is to be transferred between the UE and a base station, a single BWP may be used for a transmission, and if a relatively large amount of data is to be transferred, two or more BWPs may be used for the transmission. In some examples, such connections may be made according to a carrier aggregation (CA) mode, in which multiple component carriers (CCs), each of which can have one or more BWPs, may be used together to provide high data rate communications. Transmission attributes (e.g., subcarrier spacing (SCS), transmission beam direction, etc.) used for transmissions within a CC or BWP may differ from transmission attributes used for SS blocks. In cases where transmissions within BWPs and SS blocks are both to be communicated (e.g., via frequency division multiplexing (FDM)), complexities may arise due to, for example, capabilities of a receiving UE to handle such mixed transmission attributes. Efficient techniques for handling mixed transmission attributes associated with SS blocks and transmissions within BWPs may thus be desired.

SUMMARY

The described techniques relate to improved methods, systems, devices, or apparatuses that support frequency division multiplexing (FDM) for bandwidth part (BWP) transmissions with mixed attributes. Generally, the described techniques provide for efficient handling of mixed transmission attributes (e.g., subcarrier spacing (SCS), transmission and/or reception beam directions, etc.) associated with synchronization signal (SS) blocks and transmissions within BWPs. A user equipment (UE) may maintain timing synchronization (e.g., symbol timing synchronization) with a cell by monitoring for SS blocks routinely transmitted by a base station. In some cases, a base station may utilize FDM techniques for transmitting SS blocks and downlink transmissions (e.g., physical downlink shared channel (PDSCH), physical downlink control channel (PDCCH), channel state information reference signal (CSI-RS), etc.).

According to aspects of the present disclosure, a base station may configure a configuration for a BWP of a carrier for downlink transmissions. The BWP configuration may include a first transmission attribute (e.g., a BWP SCS, etc.) for downlink transmissions within the BWP. The base station may then transmit a grant for a downlink transmission to a UE. In some cases, the downlink transmission may be scheduled (e.g., via the grant) for a set of resources that are overlapping in time with a SS block for the carrier. The downlink transmission may be associated with transmission attributes such as a beam direction. Where there is overlap in time (e.g., at least a portion of the set of resources are FDMed with the SS block), efficient techniques for handling transmission attributes associated with SS blocks and transmission attributes associated with transmissions within BWPs are now described.

In a first example, the set of resources of the downlink transmission that overlap with the SS block may be transmitted using a second transmission attribute (e.g., the SS block SCS, the SS block beam direction, etc.). Further, the remainder of the downlink transmission (e.g., the remaining time resources of the downlink transmission not including the set of overlapping resources) may be transmitted using the first transmission attribute (e.g., a BWP SCS different from the SS block SCS, a beam direction different from the SS block beam direction, etc.). That is, the downlink transmission FDMed resources may be associated with SS block transmission attributes during time resources that overlap with the SS block, and the remaining time resources of the downlink transmission that are not FDMed with the SS block may be associated with different transmission attributes configured for the BWP (e.g., BWP transmission attributes) or for the transmissions (e.g., transmissions that don't overlap with SS block). For example, data transmissions may be associated with a beam direction that is different than the SS block beam direction.

In a second example, the entire downlink transmission may be transmitted using transmission attributes configured for the BWP (e.g., including portions of the downlink transmission, or time resources of the downlink transmission, that are FDMed with the SS block).

In a third example, the entire downlink transmission may be transmitted using SS block transmission attributes (e.g., including portions of the downlink transmission, or time resources of the downlink transmission, that are FDMed with the SS block).

In some cases, implementation of the techniques described above may be selected based on FDM capabilities of the UE. For example, the base station may transmit the downlink transmission (using BWP transmission attributes and/or SS block transmission attributes) based on a received capability message from the UE. The capabilities message may indicate whether the UE supports FDM, supports FDM with mixed transmission attributes, supports FDM reception on different beam directions, etc. Further, FDM of downlink transmissions within a configured BWP and a SS block may only refer to overlap with a SS block intended for the UE. That is, a base station may transmit several SS blocks to other UEs within the wireless communications system that may occur during the same time as the downlink transmission, however only SS blocks intended for the UE that is receiving the downlink transmission (e.g., for which that UE is expected to receive or monitor) are included when referencing FDM.

A method of wireless communication is described. The method may include identifying a configuration for a BWP of a carrier, the configuration comprising a first value for a transmission attribute for transmissions within the BWP, receiving a grant for a downlink transmission, the downlink transmission scheduled for a set of resources in the BWP that are overlapping in time with a synchronization signal block for the carrier, the synchronization signal block being transmitted using a second value for the transmission attribute, and receiving the downlink transmission, wherein the receiving comprises applying the second value for the transmission attribute for at least a portion of the set of resources.

An apparatus for wireless communication is described. The apparatus may include means for identifying a configuration for a BWP of a carrier, the configuration comprising a first value for a transmission attribute for transmissions within the BWP, means for receiving a grant for a downlink transmission, the downlink transmission scheduled for a set of resources in the BWP that are overlapping in time with a synchronization signal block for the carrier, the synchronization signal block being transmitted using a second value for the transmission attribute, and means for receiving the downlink transmission, wherein the receiving comprises applying the second value for the transmission attribute for at least a portion of the set of resources.

Another apparatus for wireless communication is described. The apparatus may include a processor, memory in electronic communication with the processor, and instructions stored in the memory. The instructions may be operable to cause the processor to identify a configuration for a BWP of a carrier, the configuration comprising a first value for a transmission attribute for transmissions within the BWP, receive a grant for a downlink transmission, the downlink transmission scheduled for a set of resources in the BWP that are overlapping in time with a synchronization signal block for the carrier, the synchronization signal block being transmitted using a second value for the transmission attribute, and receive the downlink transmission, wherein the receiving comprises applying the second value for the transmission attribute for at least a portion of the set of resources.

A non-transitory computer-readable medium for wireless communication is described. The non-transitory computer-readable medium may include instructions operable to cause a processor to identify a configuration for a BWP of a carrier, the configuration comprising a first value for a transmission attribute for transmissions within the BWP, receive a grant for a downlink transmission, the downlink transmission scheduled for a set of resources in the BWP that are overlapping in time with a synchronization signal block for the carrier, the synchronization signal block being transmitted using a second value for the transmission attribute, and receive the downlink transmission, wherein the receiving comprises applying the second value for the transmission attribute for at least a portion of the set of resources.

In some examples of the method, apparatus, and non-transitory computer-readable medium described above, the receiving the downlink transmission comprises: applying the second value for the transmission attribute for all of the set of resources.

In some examples of the method, apparatus, and non-transitory computer-readable medium described above, the receiving the downlink transmission comprises: applying the first value for the transmission attribute for a first portion of the set of resources not overlapping in time with the synchronization signal block and the second value for the transmission attribute for a second portion of the set of resources overlapping in time with the synchronization signal block.

In some examples of the method, apparatus, and non-transitory computer-readable medium described above, the transmission attribute comprises a SCS. In some examples of the method, apparatus, and non-transitory computer-readable medium described above, the one or more BWP transmission attribute comprises a transmission beam direction or a reception beam direction.

A method of wireless communication is described. The method may include configuring a configuration for a BWP of a carrier, the configuration comprising a first value for a transmission attribute for transmissions within the BWP, transmitting a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmitting the first downlink transmission, wherein the transmitting comprises applying the second value for the transmission attribute for at least a portion of the first set of resources.

An apparatus for wireless communication is described. The apparatus may include means for configuring a configuration for a BWP of a carrier, the configuration comprising a first value for a transmission attribute for transmissions within the BWP, means for transmitting a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and means for transmitting the first downlink transmission, wherein the transmitting comprises applying the second value for the transmission attribute for at least a portion of the first set of resources.

Another apparatus for wireless communication is described. The apparatus may include a processor, memory in electronic communication with the processor, and instructions stored in the memory. The instructions may be operable to cause the processor to configure a configuration for a BWP of a carrier, the configuration comprising a first value for a transmission attribute for transmissions within the BWP, transmit a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmit the first downlink transmission, wherein the transmitting comprises applying the second value for the transmission attribute for at least a portion of the first set of resources.

A non-transitory computer-readable medium for wireless communication is described. The non-transitory computer-readable medium may include instructions operable to cause a processor to configure a configuration for a BWP of a carrier, the configuration comprising a first value for a transmission attribute for transmissions within the BWP, transmit a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmit the first downlink transmission, wherein the transmitting comprises applying the second value for the transmission attribute for at least a portion of the first set of resources.

In some examples of the method, apparatus, and non-transitory computer-readable medium described above, the transmitting the first downlink transmission comprises: applying the second value for the transmission attribute for all of the first set of resources.

Some examples of the method, apparatus, and non-transitory computer-readable medium described above may further include processes, features, means, or instructions for transmitting a second downlink transmission to a second UE, the second downlink transmission overlapping in time with the first downlink transmission and not overlapping in time with the synchronization signal block, wherein the transmitting the second downlink transmission comprises inserting a guard band in the frequency domain between the first downlink transmission and the second downlink transmission.

In some examples of the method, apparatus, and non-transitory computer-readable medium described above, the transmitting the first downlink transmission comprises: applying the first value for the transmission attribute for a first portion of the first set of resources not overlapping in time with the synchronization signal block and the second value for the transmission attribute for a second portion of the first set of resources overlapping in time with the synchronization signal block.

In some examples of the method, apparatus, and non-transitory computer-readable medium described above, the transmission attribute comprises a SCS. In some examples of the method, apparatus, and non-transitory computer-readable medium described above, the one or more BWP transmission attribute comprises a transmission beam direction or a reception beam direction.

A method of wireless communication is described. The method may include configuring a configuration for a BWP of a carrier, the configuration comprising a first value for a transmission attribute for transmissions within the BWP, transmitting a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmitting the first downlink transmission, wherein the transmitting comprises applying the first value for the transmission attribute for the first set of resources and inserting a guard band in the frequency domain between the first downlink transmission and the synchronization signal block.

An apparatus for wireless communication is described. The apparatus may include means for configuring a configuration for a BWP of a carrier, the configuration comprising a first value for a transmission attribute for transmissions within the BWP, means for transmitting a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and means for transmitting the first downlink transmission, wherein the transmitting comprises applying the first value for the transmission attribute for the first set of resources and inserting a guard band in the frequency domain between the first downlink transmission and the synchronization signal block.

Another apparatus for wireless communication is described. The apparatus may include a processor, memory in electronic communication with the processor, and instructions stored in the memory. The instructions may be operable to cause the processor to configure a configuration for a BWP of a carrier, the configuration comprising a first value for a transmission attribute for transmissions within the BWP, transmit a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmit the first downlink transmission, wherein the transmitting comprises applying the first value for the transmission attribute for the first set of resources and inserting a guard band in the frequency domain between the first downlink transmission and the synchronization signal block.

A non-transitory computer-readable medium for wireless communication is described. The non-transitory computer-readable medium may include instructions operable to cause a processor to configure a configuration for a BWP of a carrier, the configuration comprising a first value for a transmission attribute for transmissions within the BWP, transmit a grant for a first downlink transmission in the BWP to a first UE, the first downlink transmission scheduled for a first set of resources that are overlapping in time with a synchronization signal block for the carrier, the synchronization signal block being transmitted using a second value for the transmission attribute, and transmit the first downlink transmission, wherein the transmitting comprises applying the first value for the transmission attribute for the first set of resources and inserting a guard band in the frequency domain between the first downlink transmission and the synchronization signal block.

In some examples of the method, apparatus, and non-transitory computer-readable medium described above, the transmitting the first downlink transmission applying the first value for the transmission attribute for the first set of resources may be based on a received capability message from the first UE indicating support for frequency division multiplexing of the first and second values for the transmission attribute.

In some examples of the method, apparatus, and non-transitory computer-readable medium described above, the transmission attribute comprises a SCS. In some examples of the method, apparatus, and non-transitory computer-readable medium described above, the one or more BWP transmission attribute comprises a transmission beam direction or a reception beam direction.

A method of wireless communication at a UE is described. The method may include receiving a synchronization signal block for a carrier, the synchronization signal block associated with synchronization signal block transmission attributes, identifying one or more BWP transmission attributes for transmissions within a BWP of the carrier, and receiving a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

An apparatus for wireless communication at a UE is described. The apparatus may include a processor, memory in electronic communication with the processor, and instructions stored in the memory. The instructions may be executable by the processor to cause the apparatus to receive a synchronization signal block for a carrier, the synchronization signal block associated with synchronization signal block transmission attributes, identify one or more BWP transmission attributes for transmissions within a BWP of the carrier, and receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

Another apparatus for wireless communication at a UE is described. The apparatus may include means for receiving a synchronization signal block for a carrier, the synchronization signal block associated with synchronization signal block transmission attributes, identifying one or more BWP transmission attributes for transmissions within a BWP of the carrier, and receiving a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

A non-transitory computer-readable medium storing code for wireless communication at a UE is described. The code may include instructions executable by a processor to receive a synchronization signal block for a carrier, the synchronization signal block associated with synchronization signal block transmission attributes, identify one or more BWP transmission attributes for transmissions within a BWP of the carrier, and receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

In some examples of the method, apparatuses, and non-transitory computer-readable medium described herein, the transmission includes a downlink control channel transmission. In some examples of the method, apparatuses, and non-transitory computer-readable medium described herein, the transmission includes a downlink shared channel transmission.

In some examples of the method, apparatuses, and non-transitory computer-readable medium described herein, the synchronization signal block transmission attributes include a first SCS and the one or more BWP transmission attributes include a second SCS. In some examples of the method, apparatuses, and non-transitory computer-readable medium described herein, the first SCS and the second SCS may be different.

In some examples of the method, apparatuses, and non-transitory computer-readable medium described herein, the one or more BWP transmission attributes include a transmission beam direction or a reception beam direction.

A method of wireless communication is described. The method may include transmitting, to a UE, a synchronization signal block for a carrier, the synchronization signal block associated with synchronization signal block transmission attributes, configuring one or more BWP transmission attributes for transmissions within a BWP of the carrier, and transmitting, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

An apparatus for wireless communication is described. The apparatus may include a processor, memory in electronic communication with the processor, and instructions stored in the memory. The instructions may be executable by the processor to cause the apparatus to transmit, to a UE, a synchronization signal block for a carrier, the synchronization signal block associated with synchronization signal block transmission attributes, configure one or more BWP transmission attributes for transmissions within a BWP of the carrier, and transmit, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

Another apparatus for wireless communication is described. The apparatus may include means for transmitting, to a UE, a synchronization signal block for a carrier, the synchronization signal block associated with synchronization signal block transmission attributes, configuring one or more bandwidth BWP transmission attributes for transmissions within a BWP of the carrier, and transmitting, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

A non-transitory computer-readable medium storing code for wireless communication is described. The code may include instructions executable by a processor to transmit, to a UE, a synchronization signal block for a carrier, the synchronization signal block associated with synchronization signal block transmission attributes, configure one or more BWP transmission attributes for transmissions within a BWP of the carrier, and transmit, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

In some examples of the method, apparatuses, and non-transitory computer-readable medium described herein, the transmission includes a downlink control channel transmission. In some examples of the method, apparatuses, and non-transitory computer-readable medium described herein, the transmission includes a downlink shared channel transmission.

Some examples of the method, apparatuses, and non-transitory computer-readable medium described herein may further include operations, features, means, or instructions for transmitting a second transmission to a second UE, the second transmission overlapping in time with the transmission and not overlapping in time with the synchronization signal block, where the transmitting the second transmission may include inserting a guard band in the frequency domain between the transmission and the second transmission.

In some examples of the method, apparatuses, and non-transitory computer-readable medium described herein, the synchronization signal block transmission attributes include a first SCS and the one or more BWP transmission attributes include a second SCS. In some examples of the method, apparatuses, and non-transitory computer-readable medium described herein, the first SCS and the second SCS may be different.

In some examples of the method, apparatuses, and non-transitory computer-readable medium described herein, the one or more BWP transmission attributes include a transmission beam direction or a reception beam direction.

A method of wireless communication is described. The method may include transmitting, to a UE, a synchronization signal block for a carrier, the synchronization signal block associated with synchronization signal block transmission attributes, configuring one or more BWP transmission attributes for transmissions within a BWP of the carrier, and transmitting, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes comprising a time division multiplexing scheme and a frequency division multiplexing scheme.

An apparatus for wireless communication is described. The apparatus may include a processor, memory in electronic communication with the processor, and instructions stored in the memory. The instructions may be executable by the processor to cause the apparatus to transmit, to a UE, a synchronization signal block for a carrier, the synchronization signal block associated with synchronization signal block transmission attributes, configure one or more BWP transmission attributes for transmissions within a BWP of the carrier, and transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

Another apparatus for wireless communication is described. The apparatus may include means for transmitting, to a UE, a synchronization signal block for a carrier, the synchronization signal block associated with synchronization signal block transmission attributes, configuring one or more BWP transmission attributes for transmissions within a BWP of the carrier, and transmitting, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

A non-transitory computer-readable medium storing code for wireless communication is described. The code may include instructions executable by a processor to transmit, to a UE, a synchronization signal block for a carrier, the synchronization signal block associated with synchronization signal block transmission attributes, configure one or more BWP transmission attributes for transmissions within a BWP of the carrier, and transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

In some examples of the method, apparatuses, and non-transitory computer-readable medium described herein, the synchronization signal block transmission attributes include a first SCS and the one or more BWP transmission attributes include a second SCS. In some examples of the method, apparatuses, and non-transitory computer-readable medium described herein, the first SCS and the second SCS may be different.

In some examples of the method, apparatuses, and non-transitory computer-readable medium described herein, the transmission attribute includes a transmission beam direction or a reception beam direction.

DETAILED DESCRIPTION

A base station may configure one or more synchronization signal (SS) blocks for transmission to a user equipment (UE) for cell acquisition and timing synchronization procedures. For example, the SS blocks may include symbols allocated for a primary SS (PSS), a secondary SS (SSS), and a physical broadcast channel (PBCH). Such SS blocks may be sent according to some SS block transmission attributes, such as some predefined numerology (e.g., a subcarrier spacing (SCS)). For example, SS blocks may be transmitted according to a 15 kHz or 30 kHz SCS for operating frequencies less than 6 GHz, and 120 kHz or 240 kHz for operating frequencies greater than 6 GHz. Additionally, a base station may utilize one or more portions of the channel frequency bandwidth, referred to as bandwidth parts (BWPs) for other downlink communications with the UE (e.g., physical downlink shared channel (PDSCH), physical downlink control channel (PDCCH), channel state information reference signals (CSI-RS), etc.). In some cases, such downlink transmissions within these configured BWPs may be associated with different transmission attributes (e.g., a SCS of downlink transmissions within the BWP may be different than the SS block SCS). For example, SS blocks may never use a certain SCS (such as 60 kHz) and thus downlink transmissions in a BWP associated with such an SCS would always have an SCS different from that of the SS blocks.

In some cases, a base station may use frequency division multiplexing (FDM) techniques to convey downlink transmissions and SS blocks. The base station may elect to transmit downlink transmissions within the BWP using transmission attributes configured for the BWP and/or using SS block transmission attributes depending on a variety of factors. Such factors may include capabilities of the UE, whether the instant time resources of the downlink transmission are FDMed with the SS block (e.g., on whether the particular time resources of the downlink transmission overlap with time resources of the SS block), etc. Techniques described herein provide for efficient FDM handling or management of SS blocks along with other downlink transmissions.

Aspects of the disclosure are initially described in the context of a wireless communications system. Example FDM scenarios employing techniques for mixed transmission attributes for transmissions within a BWP are then discussed. Aspects of the disclosure are further illustrated by and described with reference to apparatus diagrams, system diagrams, and flowcharts that relate to FDM for BWP transmissions with mixed attributes.

Figure 1:
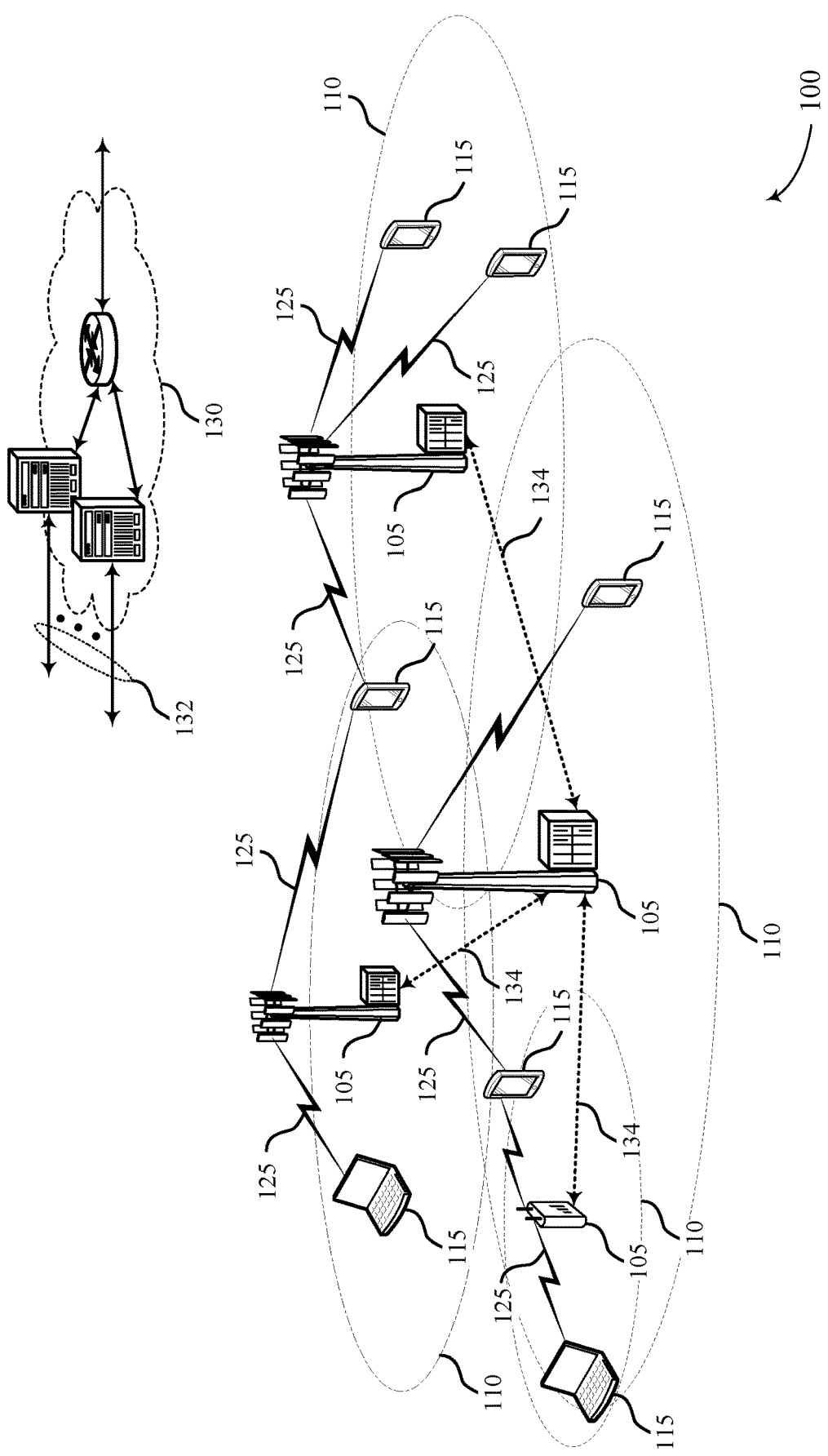
FIG. 1 illustrates an example of a wireless communications system that supports frequency division multiplexing (FDM) for bandwidth part (BWP) transmissions with mixed attributes in accordance with aspects of the present disclosure.

FIG. 1 illustrates an example of a wireless communications system 100 that supports FDM for BWP transmissions with mixed attributes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. UEs 115 may perform cell acquisition procedures and synchronization procedures with a base station 105 via monitoring for SS blocks. Once a connection is established, one or more BWPs may be configured for a communication link 125 between a base station 105 and a UE 115. In some cases, base stations 105 may utilize FDM to convey SS blocks (e.g., for synchronization) as well as downlink transmissions within the one or more configured BWPs.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT)

device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independently of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105, next generation NodeBs (gNBs) 105, etc.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased SCS. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased SCS. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, or EHF bands may have multiple antennas to allow beamforming. Beamforming may also be employed outside of these frequency bands (e.g., in any scenario in which increased cellular coverage is desired). That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the signals. Each of these beams may be referred to as a receive beam in aspects of the present disclosure.

Multiple-input multiple-output (MIMO) wireless systems use a transmission scheme between a transmitter (e.g., a base station 105) and a receiver (e.g., a UE 115), where both transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Synchronization (e.g., cell acquisition) may be performed using synchronization signals or channels transmitted by a network entity (e.g., a base station 105). A base station may transmit SS blocks containing discovery reference signals. SS blocks may include a PSS, a SSS, and/or a PBCH. A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS from the base station 105. The SSS may enable radio frame synchronization and may provide a cell group identity value. The cell group identity value may be combined with the physical layer identifier to form the physical cell identifier (PCID), which identifies the cell. The SSS may also enable detection of a duplexing mode and a cyclic prefix (CP) length. The SSS may be used to acquire other system information (e.g., subframe index). The PBCH may be used to acquire additional system information needed for acquisition (e.g., bandwidth, frame index, etc.). For example, the PBCH may carry a master information block (MIB) and one or more system information blocks (SIBs) for a given cell.

In deployments that use mmW transmission frequencies (e.g., in NR), multiple SS blocks may be transmitted in different directions using beam sweeping in a SS burst and SS bursts may be periodically transmitted according to a SS burst set. The duration of an SS burst may be referred to herein as an SS burst set measurement window. The number of directions in which the SS blocks are sent during a SS burst (e.g., during an SS burst set measurement window of 4 or 5 ms) may be different in different configurations, and the number of directions may also be a function of the bandwidth over which the base station 105 is operating. For example, SS blocks may be sent (e.g., beamformed) in four different directions when the base station 105 is operating in the 0 to 3 GHz range, in eight different directions when the base station is operating in the 3 to 6 GHz range, and up to sixty-four different directions when the base station is operating at frequencies greater than 6 GHz.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In NR, the symbol spacing in the time domain may vary with the tone spacing (or SCS) in the frequency domain. For example, an SCS of 240 kHz may correspond to a symbol duration of ~4 μs, while an SCS of 30 kHz may correspond to a symbol duration of ~33 μs. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

As indicated above, in some cases, multiple BWPs may be configured for a communication link 125 between a base station 105 and a UE 115. A base station 105 may provide an indication of an activated BWP to a UE 115 through a downlink control information (DCI) transmission that may or may not include a grant of resources of the BWP. In some cases, the UE 115 may establish the connection with the base station 105 in which one or more CCs may be configured with one or more BWPs and a CC may be activated through activation of one or more BWPs configured for the CC. Such a CC may be deactivated through deactivation of each BWP configured for the CC.

In some cases, SS blocks and downlink transmissions within configured BWPs employed by wireless communications system 100 may be associated with mixed transmission attributes (e.g., a SCS, a beam direction, etc.). That is, different (e.g., mixed) transmission attributes may be associated with SS block transmissions and other downlink transmissions within the BWPs (e.g., control transmissions such as PDCCH, or data transmissions such as PDSCH, CSI-RS, etc.). Techniques for handling such mixed transmission attributed (e.g., in FDM scenarios) are discussed in more detail with reference to the following figures.

Figure 2:
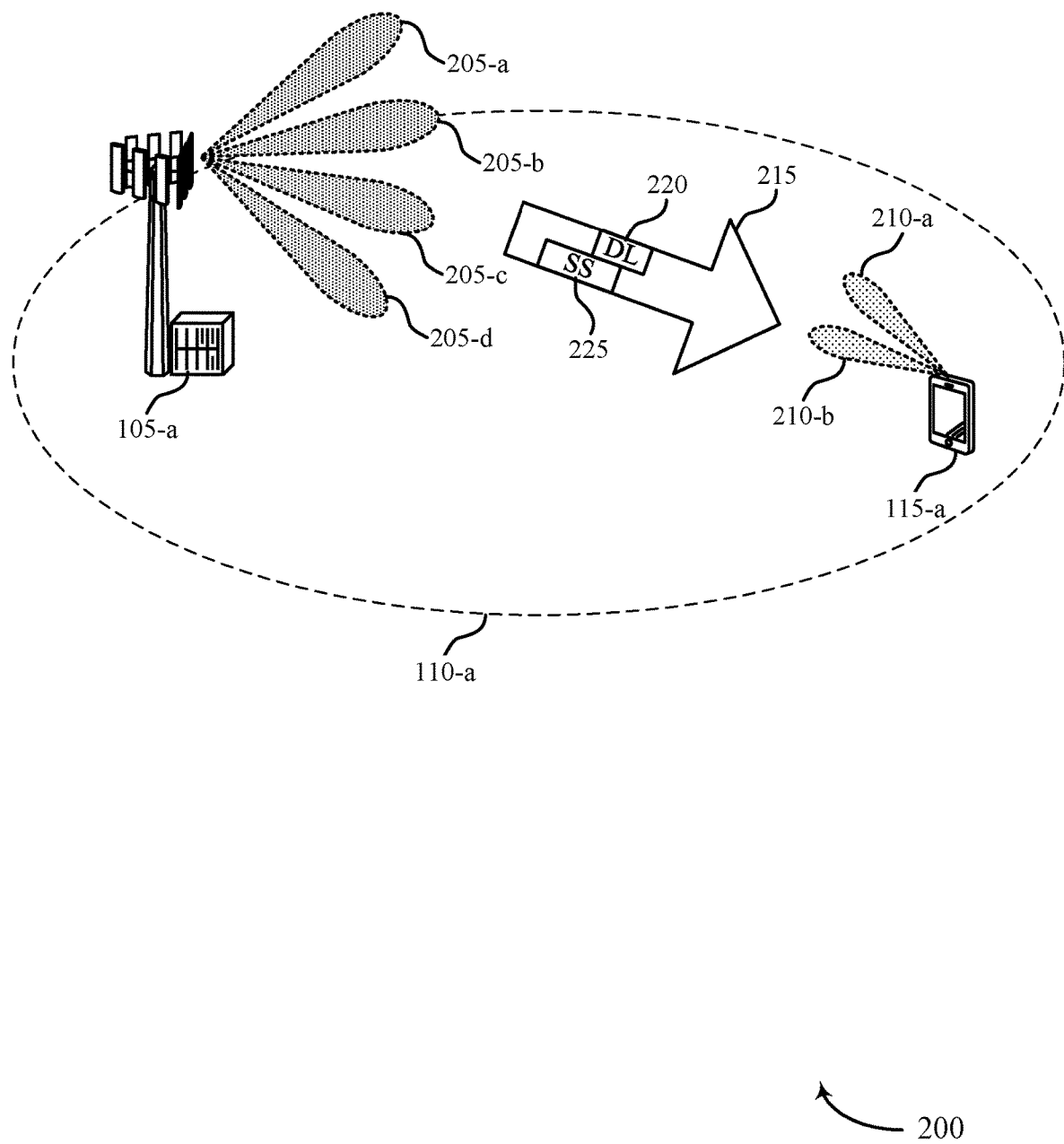
FIG. 2 illustrates an example of a wireless communications system that supports FDM for BWP transmissions with mixed attributes in accordance with aspects of the present disclosure.

FIG. 2 illustrates an example of a wireless communications system 200 that supports FDM for BWP transmissions with mixed attributes in accordance with aspects of the present disclosure. In some examples, wireless communications system 200 may implement aspects of wireless communication system 100. For example, wireless communications system 200 includes a base station 105-a and a UE 115-a, each of which may be an example of the corresponding device described with reference to FIG. 1. In the present example, base station 105-a may convey downlink communications 215 via one or more transmit beams 205. UE 115-a may receive such communications via one or more receive beams 210. Downlink communications 215 may include one or more SS blocks 225, as well as downlink transmissions 220 (e.g., downlink data or downlink signals such as PDSCH, PDCCH, CSI-RS, etc. within a configured BWP). In some cases, downlink communications 215 may employ FDM. Further SS blocks 225 and downlink transmissions 220 may each be associated with some transmission attributes (e.g., SCS, a beam direction associated with a transmit beam 205, a beam direction associated with a receive beam 210, etc.). In some cases, transmit or receive beam direction may correspond to a beam identifier (ID).

A base station 105-a may configure one or more SS blocks 225 for transmission to UE 115-a for cell acquisition and timing synchronization procedures (e.g., to assist a UE 115-a in synchronizing with a cell associated with the base station 105-a). For example, an SS block 225 may include signals (e.g., a PSS, a SSS, and PBCH) that assist the UE 115-a to acquire the cell's timing. In some cases, base station 115-a may transmit multiple SS blocks 225, for example, in a SS burst that lasts for a particular duration of time. SS blocks may be transmitted at different times and in different directions using beamforming, for example, in a beam sweeping pattern (e.g., the beam sweeping pattern including transmit beams 205-a, 205-b, 205-c, 205-d, etc.). However, such SS bursts may be intended for multiple UEs 115 (e.g., whereas a particular SS block 225 associated with transmit beam 205-c may be intended for UE 115-a, as further described with reference to FIG. 3). In some examples, SS bursts or SS blocks 225 may be conveyed periodically such that a UE 115 may maintain synchronization with a base station 105 over time.

In one example, UE 115-a may form receive beams 210-a and 210-b. In some cases, the receive beams 210-a and 210-b may each receive signals sent over one or more transmit beams 205. Because the signal transmitted over one transmit beam 205 may experience different path losses and phase shifts on its way to the respective antennas of the UE 115-a, and because each receive beam 210-a and 210-b may weight antennas of the UE 115-a differently, the signal received over one receive beam 210 may have different signal properties from the signal received over a different receive beam 210. UE 115-a may select a transmit beam 205 and a receive beam 210 based on the received signal quality. The transmit beam 205 and corresponding receive beam 210 may be referred to as a beam pair. For example, in some cases base station 105-a may repeat transmissions over multiple transmit beams 205 (e.g., in every direction) and UE 115-a may report a beam which the UE can receive (e.g., via receive beam 210-a or 210-b) with a signal quality above a threshold, or may report the strongest received beam. These transmit beams 205 may be broadcast beams directed to one or more UEs 115 and may, in some cases, each be associated with an SS block 225.

Additionally, base station 105-a may utilize one or more portions of the channel frequency bandwidth (e.g., associated with downlink communications 215), which may in some cases be referred to as a BWP for downlink transmissions 220. A BWP may be configured, for example, according to a size of the channel frequency bandwidth, a size of downlink transmissions 220, capabilities of the UE 115-a or of other UEs 115, etc.

SS blocks 225 and downlink transmissions 220 may be sent according to some transmission attributes including, for example, a SCS, a beam direction (e.g., associated with the transmission and/or reception of the SS block 225 or downlink transmission 220), etc. For example, SS blocks 225 may be transmitted according to a SCS of 15 kHz or 30 kHz SCS for operating frequencies less than 6 GHz, and a SCS of 120 kHz or 240 kHz for operating frequencies greater than 6 GHz. A UE 115 may identify the transmission attributes via implicit or explicit information. For example, the UE 115 may be cross carrier scheduled to a carrier and may receive information regarding the transmission attributes of the carrier prior to receiving the SS block. Additionally or alternatively, the UE 115 may monitor the carrier for SS blocks according to one or more transmission attributes and may thus detect the transmission attributes implicitly by detecting the SS blocks. Additionally, downlink transmissions 220 (e.g., PDSCH, PDCCH, CSI-RS, etc. transmitted within one or more configured BWPs) may be associated with different transmission attributes. For example, downlink transmissions 220 may be transmitted according to a different SCS (compared to, e.g., the SCS of the transmitted SS blocks 225), a different transmit beam 205, a difference receive beam 210, etc. Generally, transmission attributes for SS blocks may be referred to as SS block transmission attributes, transmission attributes included in a configuration for a BWP of a carrier may be referred to as BWP transmission attributes, and transmission attributes associated with a channel or signal may be referred to as channel or signal attributes. A set of transmission attributes may also be referred to as a numerology. Techniques described herein provide for efficient handling or management of FDM communications in scenarios where SS blocks 225 and other downlink transmissions 220 are associated with mixed numerologies (e.g., transmission parameters, characteristics, etc.).

For example, a base station 105-a may identify a configuration for a BWP (e.g., of a carrier) that includes one or more BWP transmission attributes for transmissions within the BWP. That is, the base station 105-a may configure transmission attributes for downlink transmissions 220 within a BWP. For example, the base station 105-a may associate a SCS with the configured BWP, or may configure channels or signals for transmission via the BWP with transmission attributes. Additionally or alternatively, the base station 105-a may associate a beam direction (e.g., a beam ID associated with a transmit beam 205, a receive beam 210, or an active beam pair) with the configured BWP.

Further, The UE 115 may identify the one or more BWP transmission attributes based on a BWP configuration that may be determined by the UE, for example, from a PBCH payload included as a part of the transmitted SS block. As such, the BWP transmission attributes can be identified based on a signal, such as the SS block transmission. Base station 105-a may transmit a grant for the downlink transmission 220 to UE 115-a. In some examples, the grant may indicate resources that overlap in time with SS blocks 225 intended for the UE 115-a (e.g., FDM). UE 115-a may identify SS block 225 resources (e.g., symbol periods on which SS block 225 is transmitted) via remaining minimum system information (RMSI) or RRC configuration and may identify timing of downlink transmissions 220 via the received grant. If the time-overlapping downlink transmission 220 and SS block 225 are associated with the same transmission attributes (e.g., the same SCS), the FDM may not present any problems for reception by UEs 115. However, in cases where downlink transmission 220 and SS block 225 are associated with different or mixed transmission attributes, some UEs 115 may not be capable of processing FDM signals having mixed attributes. For example, a UE 115 that receives multiple signals that are FDMed with different SCSs may need to run separate inverse discrete Fourier transform (IDFT) or inverse fast Fourier transform (IFFT) operations to demodulate the different signals. Some UEs may not have sufficient processing resources to perform the parallel operations. Techniques to handle such FDM (e.g., with mixed transmission attributes) may be employed, as discussed in more detail below with reference to FIGS. 3A-3C. In yet other cases, a UE may not support such FDM (e.g. of resources of downlink transmissions 220 overlapping with SS blocks 225 in time) and PDSCH grants for overlapping resources may be rejected.

In some cases, the transmission attributes may be configured based on a UE capabilities indication. For example, the base station 105-a may elect transmission attributes (e.g., SS block transmission attributes and/or BWP transmission attributes) for a downlink transmission 220 based on a received capabilities message from UE 115-a. In some cases, the capabilities message may indicate whether the UE supports FDM, supports FDM with mixed transmission attributes, supports TDM of transmission attributes within grants, etc. Some techniques described herein may thus be elected or ruled out based on such capabilities indicated by a UE. For example, if a UE indicates it does not support FDM reception over different beam directions, a base station may use the same beam direction (e.g., beam ID) for both SS blocks 225 and downlink transmissions 220 where FDM is used. As another example, if a UE indicates it cannot support FDM with mixed transmission attributes, the base station 105 may transmit downlink transmissions 220 that are FDMed with the SS block using SS block transmission attributes (with possible TDM of transmission attributes within downlink transmissions 220). In cases in which TDM is used for mixed beams (e.g., using different transmit beams 205 and/or receive beams 210) within a downlink transmission 220, separate demodulation reference signals (DMRSs) may be used in each of the TDMed portions (e.g., to enable channel estimation for each portion).

In some cases, downlink transmissions 220 may not be FDMed with SS blocks 225 for a given UE 115 (e.g., in cases where the UE 115 indicates it is not capable of supporting FDM). In such cases, the base station 105-a may not transmit downlink transmissions 220 (e.g., PDSCH) during any overlapping symbol periods for which SS blocks 225 are scheduled. Such a UE 115 may reject any grant for a downlink transmission which indicates that the transmission will overlap with SS blocks that it is expected to monitor. For example, the UE 115 may treat the grant as being falsely decoded (e.g., a false CRC-pass during PDCCH decoding).

It is to be understood that while the examples above are described in terms of downlink transmissions (i.e., such that the transmit beams 205 originate at the base station 105-a), analogous considerations for uplink transmissions are included in the scope of the present disclosure.

Figure 3A:
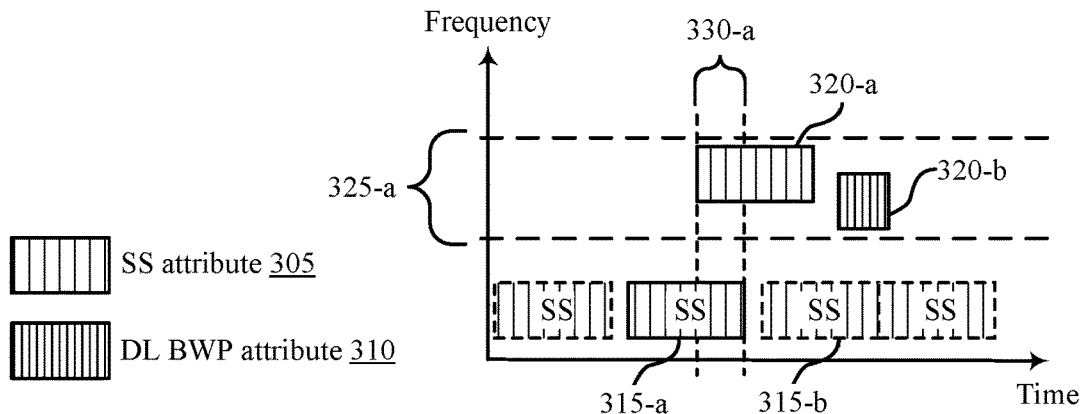
FIGS. 3A, 3B and 3C illustrate examples of FDM for BWP transmissions with mixed attributes in accordance with aspects of the present disclosure.
Figure 3B:
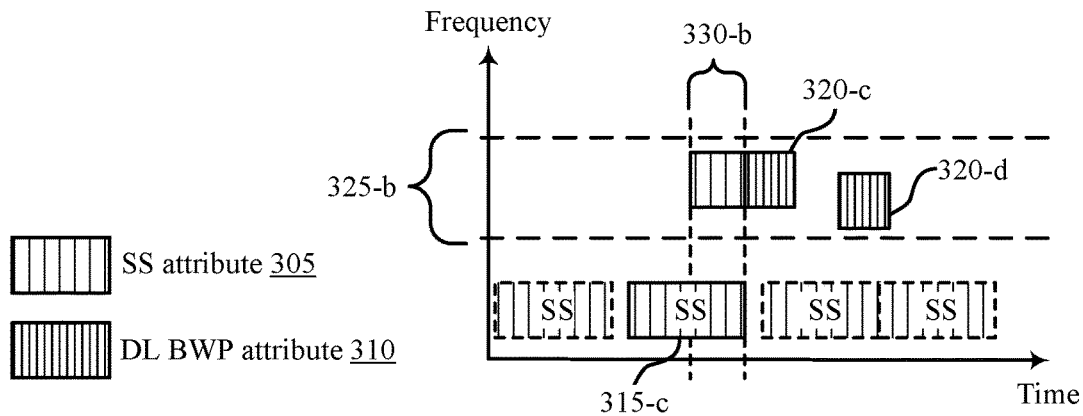
Figure 3C:
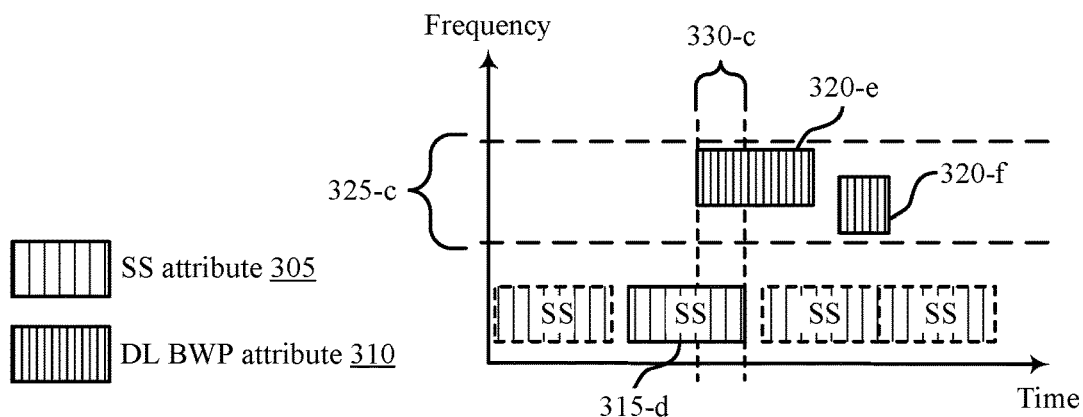

FIGS. 3A, 3B, and 3C illustrate examples 300-a, 300-b, and 300-c of FDM for BWP transmissions with mixed attributes in accordance with aspects of the present disclosure. The examples of FIGS. 3A-3C may implement aspects of wireless communications system 100 and wireless communications system 200. Generally, transmission attributes for SS blocks may be referred to as SS attributes 305, and transmission attributes included in a configuration for a BWP of a carrier (e.g., or transmission attributes for transmissions within a BWP) may be referred to as BWP attributes 310. Techniques described herein provide three examples for efficient handling or management of FDM communications in scenarios where SS blocks 315 and other downlink transmissions 320 are associated with mixed transmission attributes (e.g., transmission parameters, characteristics, etc., which may refer to SCS, transmit beam ID, received beam ID, beam pair ID, etc.). In some cases, the downlink transmissions may be multiplexed with the SS blocks according to a scheme or pattern (e.g., FDM and/or TDM). In examples 300-a, 300-b, and 300-c, frequency (e.g., kHz) may generally be represented along the vertical axis and time (e.g., seconds) may generally be represented along the horizontal axis.

FIG. 3A illustrates an example 300-a in which a downlink transmission 320-a is scheduled within a BWP 325-a (e.g., via a base station 105 or a grant from a base station 105). The downlink transmission 320-a is FDMed with an SS block 315-a for a set of time resources 330-a. In some cases, the set of time resources 330-a may be referred to as a FDM time duration. According to the techniques shown in example 300-a, the entire downlink transmission 320-a may be transmitted (e.g., by a base station 105) using one or more SS attributes 305. That is, both the set of time resources 330-a (e.g., FDM portion) of downlink transmission 320-a as well as the remaining portion (e.g., remaining resources of the downlink transmission 320-a not overlapping in time with the SS block 315-a) may be associated with the SS attributes 305. For example, there may be no mixed numerology associated with the FDM region (e.g., the set of time resources 330-*a*), as the FDM region may be associated with only SS attributes 305. Further, a subsequent downlink transmission 320-*b* may also be scheduled in the BWP 325-*a* (e.g., at a time following the downlink transmission 320-*a*). In some cases, the downlink transmission 320-*b* may be a subsequent downlink transmission for the same UE that does not overlap in time with SS block 315-*a*, and thus may use the DL BWP attributes 310. Additionally, in some cases BWP 325-*a* may include additional transmissions (not shown) for different UEs, some of which may be FDMed with the downlink transmission 320-*a*. The base station may insert guardband in the frequency domain between FDM transmissions having some mixed attributes (e.g., guardband may be inserted for FDM of mixed SCS transmissions but not between FDM of mixed beam direction, etc.).

FIG. 3A also illustrates SS blocks (dashed) that may be present (e.g., or sent by a serving base station) that are not intended for the UE receiving the downlink transmission 320-*a*. As discussed above, such SS blocks not directed to the relevant UE do not contribute to FDM scenarios and are not considered in transmission attribute selection for downlink transmissions 320 intended for the UE. That is, SS block 315-*b* may be intended for or transmitted to some other neighboring UE. Although SS block 315-*b* may overlap in time with downlink transmission 320-*b*, downlink transmission 320-*b* may still be associated with BWP attribute 310 (e.g., thus the technique of example 300-*a*, as applied to downlink transmission 320-*a*, may not apply to downlink transmission 320-*b* as the UE receiving both downlink transmission 320-*a* and downlink transmission 320-*b* may not be monitoring for SS block 315-*b*). In one example, techniques described with reference to example 300-*a* may be elected when a UE indicates (e.g., via a capability message) that it supports FDM, but does not support FDM with mixed attributes (e.g., mixed numerology).

FIG. 3B illustrates an example 300-*b* where a downlink transmission 320-*c* is scheduled within a BWP 325-*b* (e.g., via a base station 105 or a grant from a base station 105). The downlink transmission 320-*c* is FDMed with an SS block 315-*c* for a set of time resources 330-*b*. In some cases, the set of time resources 330-*b* may be referred to as a FDM time duration. According to the techniques shown in example 300-*b*, the portion of downlink transmission 320-*c* associated with the set of time resources 330-*b* (e.g., FDM portion) may be associated with SS attributes 305. However, the remaining portion (e.g., remaining resources of downlink transmission 320-*c* not overlapping in time with SS block 315-*c*) may be associated with BWP attributes 310. Thus, there may be no mixed numerology associated with the FDM region (e.g., the set of time resources 330-*b*), as the FDM region may be associated with only SS attributes 305. However, there are TDM regions of mixed numerology within downlink transmission 320-*c*. Further, a subsequent downlink transmission 320-*d* may also be scheduled in the BWP 325-*b* (e.g., at a time following the downlink transmission 320-*c*). As illustrated in FIG. 3B, downlink transmission 320-*d* may follow a combined TDM and FDM scheme with SS block 315-*c*.

FIG. 3B also illustrates SS blocks (dashed) that may be present (e.g., or sent by a serving base station) that are not intended for the UE receiving the downlink transmission 320-*c*. As discussed above, such SS blocks not directed to the UE of relevance do not contribute to FDM scenarios nor to transmission attribute selection for downlink transmissions 320 intended for the UE, etc. That is, dashed SS blocks shown may be intended for or transmitted to some other neighboring UE. Although such SS blocks intended for other UEs may overlap in time with downlink transmission 320-*d*, downlink transmission 320-*d* may still be associated with BWP attribute 310 (e.g., thus the technique of example 300-*b*, as applied to downlink transmission 320-*c*, may not apply to downlink transmission 320-*d* as the UE receiving both downlink transmission 320-*c* and downlink transmission 320-*d* may not be monitoring for SS blocks intended for other UEs). In one example, techniques described with reference to example 300-*b* may be elected when a UE indicates (e.g., via a capability message) that it supports TDM mixed numerology and FDM, but does not support FDM with mixed numerology. Further, in the example 300-*b*, although FDM mixed numerology may not be supported, TDM mixed numerology (e.g., within a single downlink packet (e.g., within downlink transmission 320-*c*) may be utilized. Note that some UEs may be limited in capability and may not be able to receive TDM mixed numerology. When the scheme in FIG. 3B is used, such a UE rejects any grant indicating a data transmission that overlaps only partially with the SS blocks, but accepts grants indicating data transmissions that completely overlap with the SS blocks or are completely non-overlapping with SS blocks. As described above, SS blocks in this context refers only to SS blocks that the UE is expected to receive or monitor.

FIG. 3C illustrates an example 300-*c* where a downlink transmission 320-*e* is scheduled within a BWP 325-*c* (e.g., via a base station 105 or a grant from a base station 105). The downlink transmission 320-*e* is FDMed with an SS block 315-*d* for a set of time resources 330-*c*. In some cases, the set of time resources 330-*c* may be referred to as a FDM time duration. According to the techniques shown in example 300-*c*, the portion of downlink transmission 320-*e* associated with the set of time resources 330-*c* (e.g., FDM portion), as well as the remaining portion (e.g., remaining resources of downlink transmission 320-*e* not overlapping with SS block 315-*d*) may be associated with BWP attributes 310. The techniques shown in example 300-*c* may result in mixed numerology associated with the FDM region (e.g., the set of time resources 330-*c*), as the FDM region may be associated with both SS attributes 305 and BWP attributes 310. Further, a subsequent downlink transmission 320-*f* may also be scheduled in the BWP 325-*c* (e.g., at a time following the downlink transmission 320-*e*). As illustrated in FIG. 3C, downlink transmission 320-*f* may follow a combined TDM and FDM scheme with respect to SS block 315-*d*.

FIG. 3C also illustrates SS blocks (dashed) that may be present (e.g., or sent by a serving base station) that are not intended for the UE receiving the downlink transmission 320-*e* or 320-*f*. As discussed above, such SS blocks not directed to the UE of relevance do not contribute to FDM scenarios, nor to transmission attribute selection for downlink transmissions 320 intended for the UE. In one example, techniques described with reference to example 300-*c* may be elected when a UE indicates (e.g., via a capability message) that it supports FDM with mixed numerology. In some cases, the base station may also ensure a sufficient guard band between FDMed mixed numerologies (e.g., guardband may be inserted for FDM of mixed SCS transmissions but not between FDM of mixed beam direction, etc.).

Figure 4:
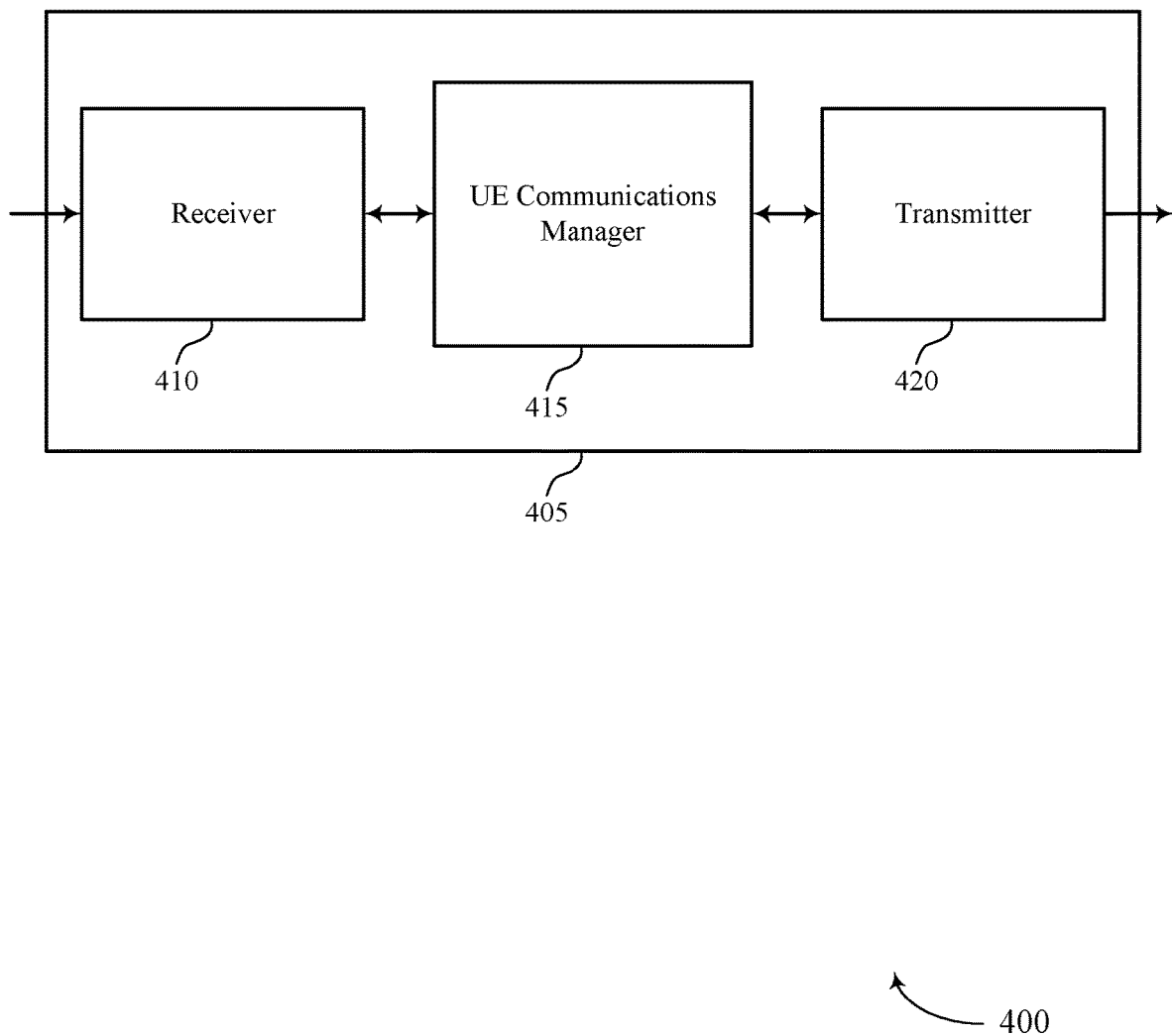
FIGS. 4 and 5 show block diagrams of wireless devices that support FDM for BWP transmissions with mixed attributes in accordance with aspects of the present disclosure.

FIG. 4 shows a block diagram 400 of a wireless device 405 that supports FDM for BWP transmissions with mixed attributes in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to FDM for BWP transmissions with mixed attributes, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In a first example, the UE communications manager 415 may identify a configuration for a BWP of a carrier. The configuration may include a first value for a transmission attribute for transmissions within the BWP. The UE communications manager 415 may receive a grant for a downlink transmission. In some cases, the downlink transmission may be scheduled for a set of resources in the BWP that are overlapping in time with a SS block for the carrier. The SS block may be transmitted using a second value for the transmission attribute. The UE communications manager 415 may then receive the downlink transmission, where the receiving includes applying the second value for the transmission attribute for at least a portion of the set of resources.

In a second example, the UE communications manager 415 may receive a synchronization signal block for a carrier, the synchronization signal block associated with synchronization signal block transmission attributes, identify one or more BWP transmission attributes for transmissions within a BWP of the carrier, and receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
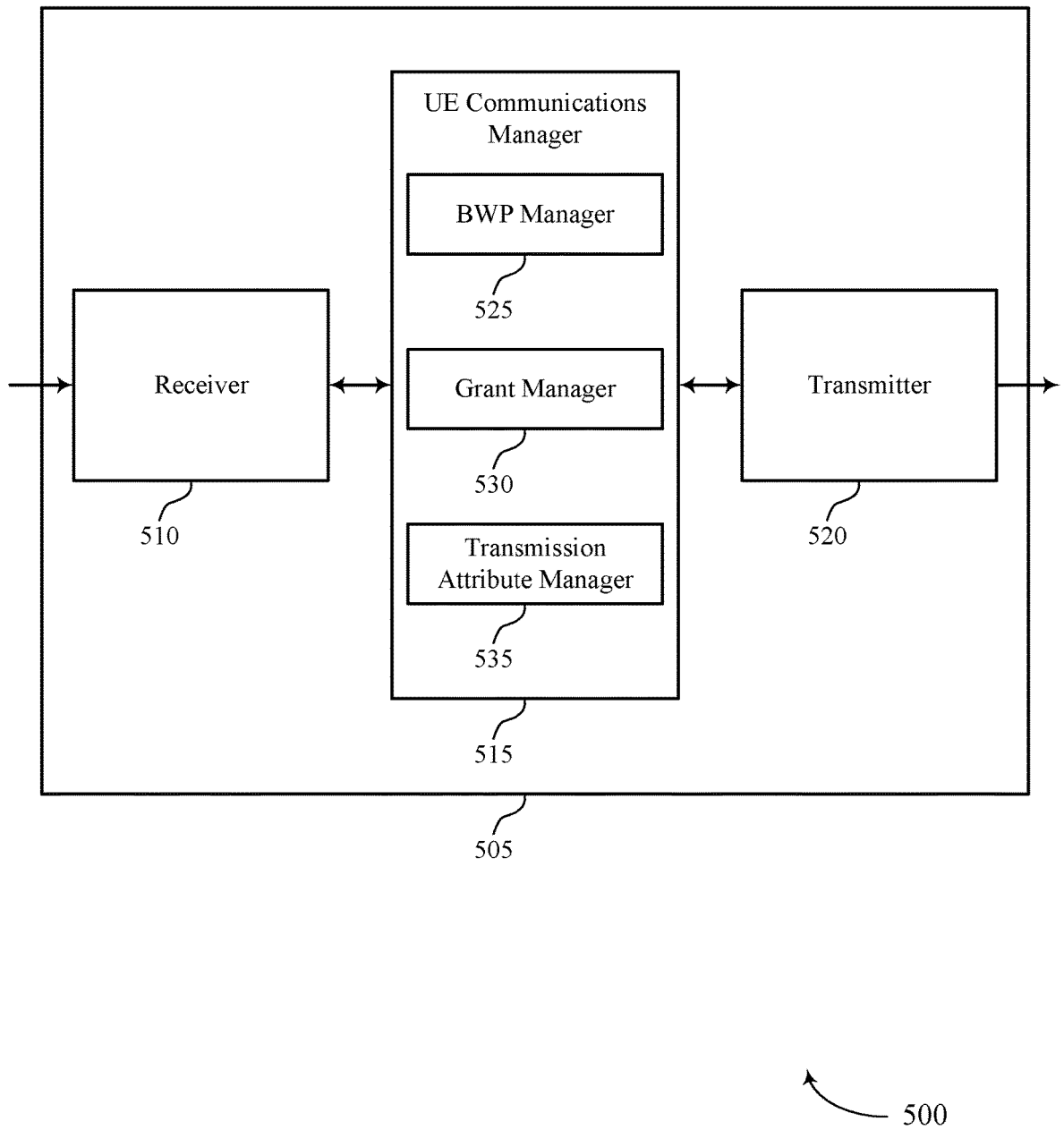

FIG. 5 shows a block diagram 500 of a wireless device 505 that supports FDM for BWP transmissions with mixed attributes in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to FDM for BWP transmissions with mixed attributes, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include BWP manager 525, grant manager 530, and transmission attribute manager 535.

In a first example, the BWP manager 525 may identify a configuration for a BWP of a carrier, the configuration may include a first value for a transmission attribute for transmissions within the BWP. In some cases, the transmission attribute may include a SCS, a reception beam direction, etc.

In a second example, the BWP manager 525 may receive a synchronization signal block for a carrier, the synchronization signal block associated with synchronization signal block transmission attributes and identify one or more BWP transmission attributes for transmissions within a BWP of the carrier.

In the first example, the grant manager 530 may receive a grant for a downlink transmission, the downlink transmission scheduled for a set of resources in the BWP that are overlapping in time with a SS block for the carrier, the SS block being transmitted using a second value for the transmission attribute.

In the first example, the transmission attribute manager 535 may receive the downlink transmission, where the receiving includes applying the second value for the transmission attribute for at least a portion of the set of resources. In some cases, the receiving the downlink transmission includes applying the second value for the transmission attribute for all of the set of resources. In some cases, the receiving the downlink transmission includes applying the first value for the transmission attribute for a first portion of the set of resources not overlapping in time with the SS block and the second value for the transmission attribute for a second portion of the set of resources overlapping in time with the SS block.

In the second example, the transmission attribute manager 535 may receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
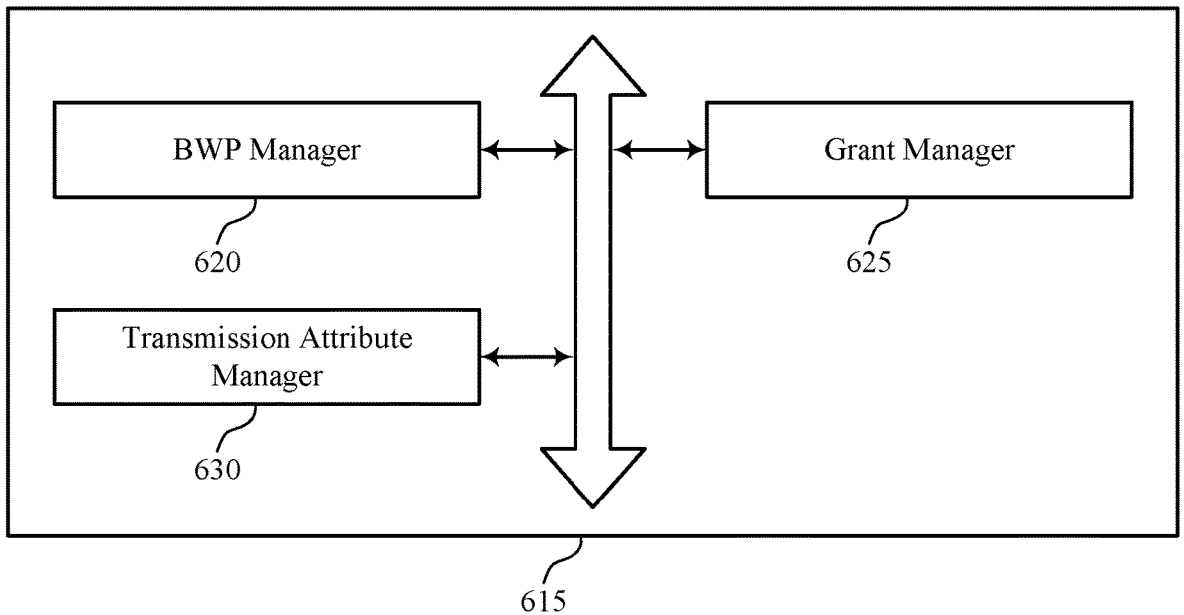
FIG. 6 shows a block diagram of a UE communications manager that supports FDM for BWP transmissions with mixed attributes in accordance with aspects of the present disclosure.

FIG. 6 shows a block diagram 600 of a UE communications manager 615 that supports FDM for BWP transmissions with mixed attributes in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include BWP manager 620, grant manager 625, and transmission attribute manager 630. Each of these modules may communicate, directly or indirectly, with one another (e.g., via one or more buses).

The BWP manager 620 may identify a configuration for a BWP of a carrier, the configuration including a first value for a transmission attribute for transmissions within the BWP. In some cases, the transmission attribute includes a SCS. In some cases, the transmission attribute includes a transmission beam direction or a reception beam direction.

Additionally or alternatively, the BWP manager 620 may receive a synchronization signal block for a carrier, the synchronization signal block associated with synchronization signal block transmission attributes. In some cases, the BWP manager 620 may identify one or more BWP transmission attributes for transmissions within a BWP of the carrier. In some cases, the synchronization signal block transmission attributes include a first SCS and the one or more BWP transmission attributes include a second SCS. In some cases, the first SCS and the second SCS are different. In some cases, the one or more BWP transmission attributes include a transmission beam direction or a reception beam direction.

Grant manager 625 may receive a grant for a downlink transmission, the downlink transmission scheduled for a set of resources in the BWP that are overlapping in time with a SS block for the carrier. The SS block may be transmitted using a second value for the transmission attribute.

The transmission attribute manager 630 may receive the downlink transmission, where the receiving includes applying the second value for the transmission attribute for at least a portion of the set of resources. In some cases, the receiving the downlink transmission includes applying the second value for the transmission attribute for all of the set of resources. In some cases, the receiving the downlink transmission includes applying the first value for the transmission attribute for a first portion of the set of resources not overlapping in time with the SS block and applying the second value for the transmission attribute for a second portion of the set of resources overlapping in time with the SS block.

Additionally or alternatively, the transmission attribute manager 630 may receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme. In some cases, the transmission includes a downlink control channel transmission. In some cases, the transmission includes a downlink shared channel transmission.

Figure 7:
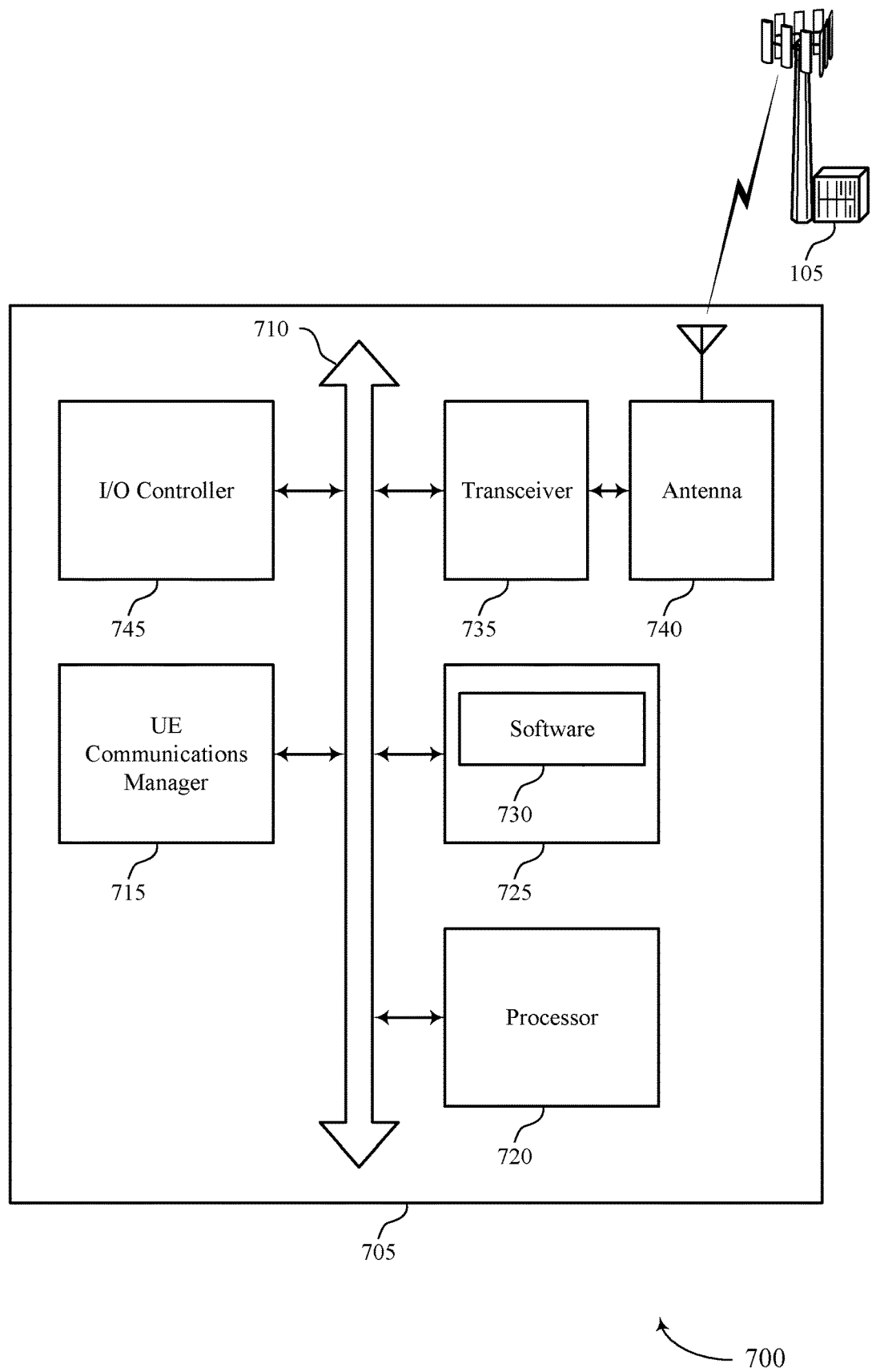
FIG. 7 illustrates a diagram of a system including a device that supports FDM for BWP transmissions with mixed attributes in accordance with aspects of the present disclosure.

FIG. 7 shows a diagram of a system 700 including a device 705 that supports FDM for BWP transmissions with mixed attributes in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting FDM for BWP transmissions with mixed attributes).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support FDM for BWP transmissions with mixed attributes. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
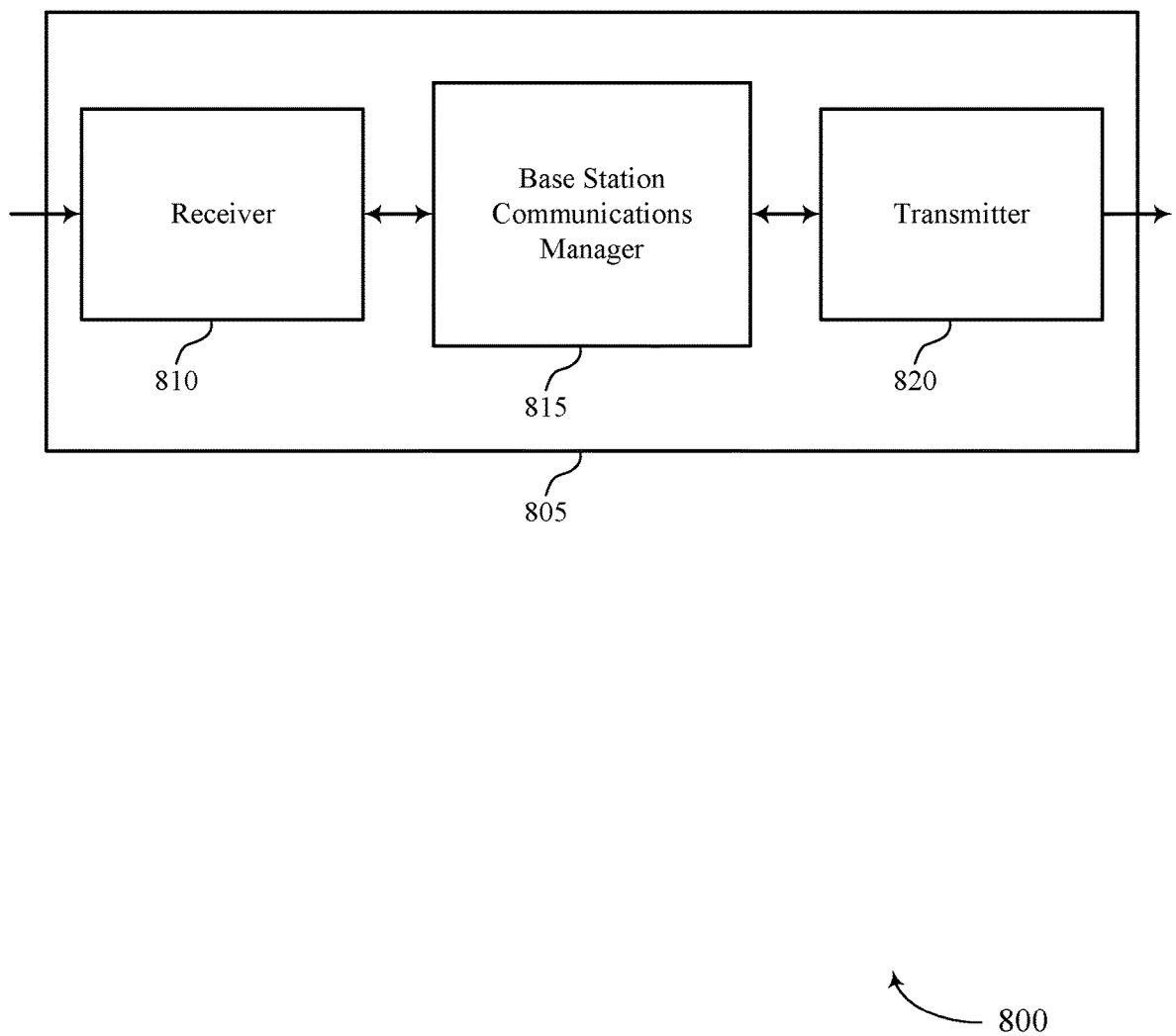
FIGS. 8 and 9 show block diagrams of wireless devices that support FDM for BWP transmissions with mixed attributes in accordance with aspects of the present disclosure.

FIG. 8 shows a block diagram 800 of a wireless device 805 that supports FDM for BWP transmissions with mixed attributes in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to FDM for BWP transmissions with mixed attributes, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The base station communications manager 815 may identify a configuration for a BWP of a carrier, the configuration may include a first value for a transmission attribute for transmissions within the BWP. The base station communications manager 815 may transmit a grant for a first downlink transmission in the BWP to a first UE. In some cases, the first downlink transmission may be scheduled for a first set of resources that are overlapping in time with a SS block for the carrier (e.g., the SS block may be transmitted using a second value for the transmission attribute). Base station communications manager 815 may then transmit the first downlink transmission, where the transmitting includes applying the second value for the transmission attribute for at least a portion of the first set of resources.

The base station communications manager 815 may also identify a configuration for a BWP of a carrier, the configuration including a first value for a transmission attribute for transmissions within the BWP. The base station communications manager 815 may transmit a grant for a first downlink transmission in the BWP to a first UE, the first downlink transmission scheduled for a first set of resources that are overlapping in time with a SS block for the carrier (e.g., the SS block being transmitted using a second value for the transmission attribute). The base station communications manager 815 may then transmit the first downlink transmission, where the transmitting includes applying the first value for the transmission attribute for the first set of resources and inserting a guard band in the frequency domain between the first downlink transmission and the SS block.

Additionally or alternatively, the base station communications manager 815 may transmit, to a UE, a synchronization signal block for a carrier, the synchronization signal block associated with synchronization signal block transmission attributes and configure one or more BWP transmission attributes for transmissions within a BWP of the carrier. The base station communications manager 815 may transmit, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme.

Further additionally or alternatively, the base station communications manager 815 may also transmit, to a UE, a synchronization signal block for a carrier, the synchronization signal block associated with synchronization signal block transmission attributes and configure one or more BWP transmission attributes for transmissions within a BWP of the carrier. The base station communications manager 815 may transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
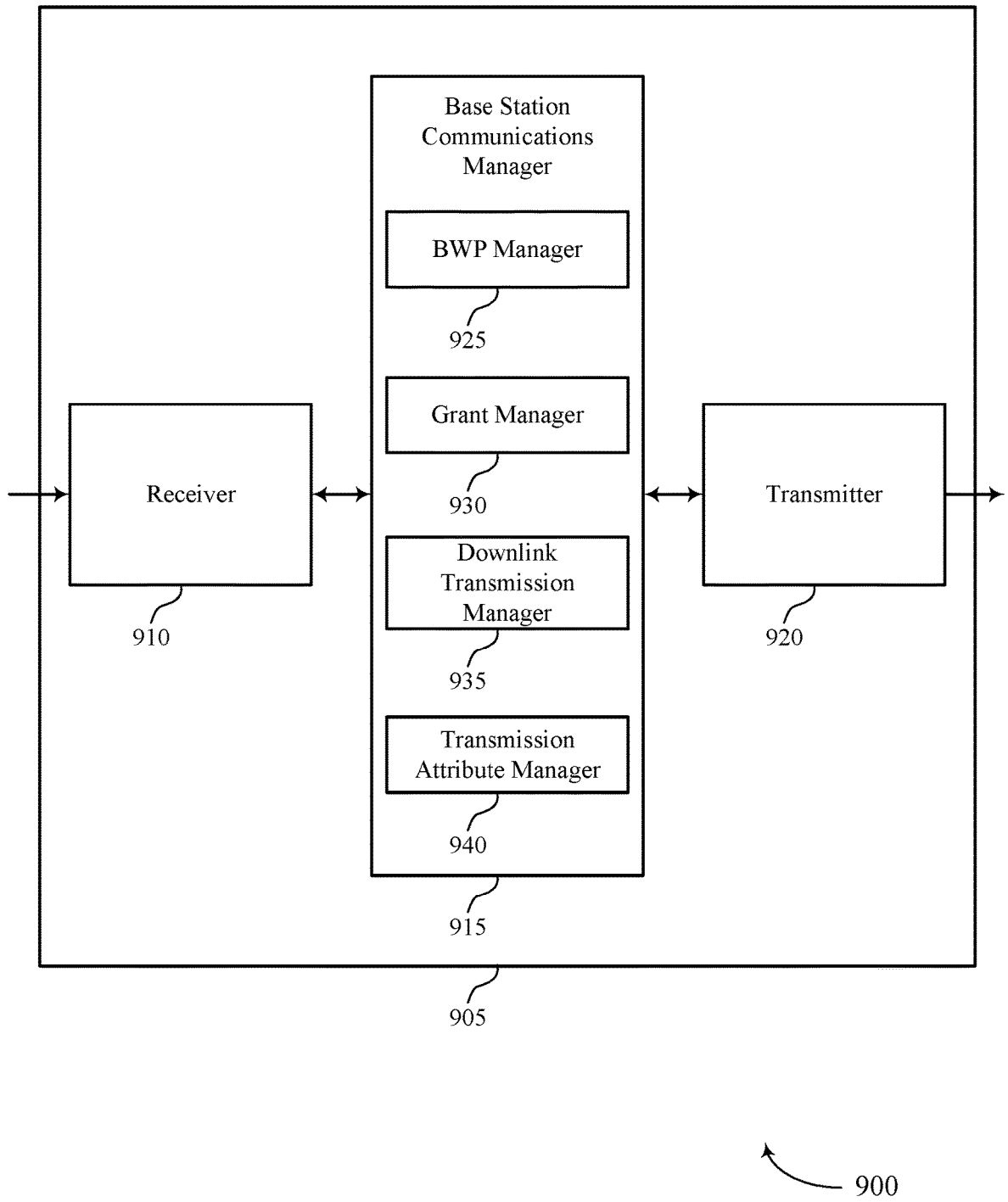

FIG. 9 shows a block diagram 900 of a wireless device 905 that supports FDM for BWP transmissions with mixed attributes in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to FDM for BWP transmissions with mixed attributes, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include BWP manager 925, grant manager 930, downlink transmission manager 935, and transmission attribute manager 940.

In a first example, the BWP manager 925 may identify a configuration for a BWP of a carrier, the configuration including a first value for a transmission attribute for transmissions within the BWP.

In a second example, the BWP manager 925 may transmit, to a UE, a synchronization signal block for a carrier, the synchronization signal block associated with synchronization signal block transmission attributes and configure one or more BWP transmission attributes for transmissions within a BWP of the carrier.

In a third example, the BWP manager 925 may similarly transmit, to a UE, a synchronization signal block for a carrier, the synchronization signal block associated with synchronization signal block transmission attributes and configure one or more BWP transmission attributes for transmissions within a BWP of the carrier.

In the first example, the grant manager 930 may transmit a grant for a first downlink transmission in the BWP to a first UE, the first downlink transmission scheduled for a first set of resources that are overlapping in time with a SS block for the carrier, the SS block being transmitted using a second value for the transmission attribute.

In the first example, the downlink transmission manager 935 may transmit the first downlink transmission, where the transmitting includes applying the second value for the transmission attribute for at least a portion of the first set of resources.

In the second example, the downlink transmission manager 935 may transmit, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme.

In the third example, the downlink transmission manager 935 may transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

In the first example, the transmission attribute manager 940 may transmit a second downlink transmission to a second UE, the second downlink transmission overlapping in time with the first downlink transmission and not overlapping in time with the SS block, where the transmitting second downlink transmission includes inserting a guard band in the frequency domain between the first downlink transmission and the second downlink transmission and transmit the first downlink transmission. In some cases, the transmitting includes applying the first value for the transmission attribute for the first set of resources and inserting a guard band in the frequency domain between the first downlink transmission and the SS block. In some cases, the transmitting the first downlink transmission includes: applying the second value for the transmission attribute for all of the first set of resources. In some cases, the transmitting the first downlink transmission includes: applying the first value for the transmission attribute for a first portion of the first set of resources not overlapping in time with the SS block and the second value for the transmission attribute for a second portion of the first set of resources overlapping in time with the SS block. In some cases, the transmission attribute includes a SCS. In some cases, the transmission attribute includes a transmission beam direction or a reception beam direction. In some cases, the transmitting the first downlink transmission applying the first value for the transmission attribute for the first set of resources is based on a received capability message from the first UE indicating support for frequency division multiplexing of the first and second values for the transmission attribute. In some cases, the transmission attribute includes a SCS. In some cases, the transmission attribute includes a transmission beam direction or a reception beam direction.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
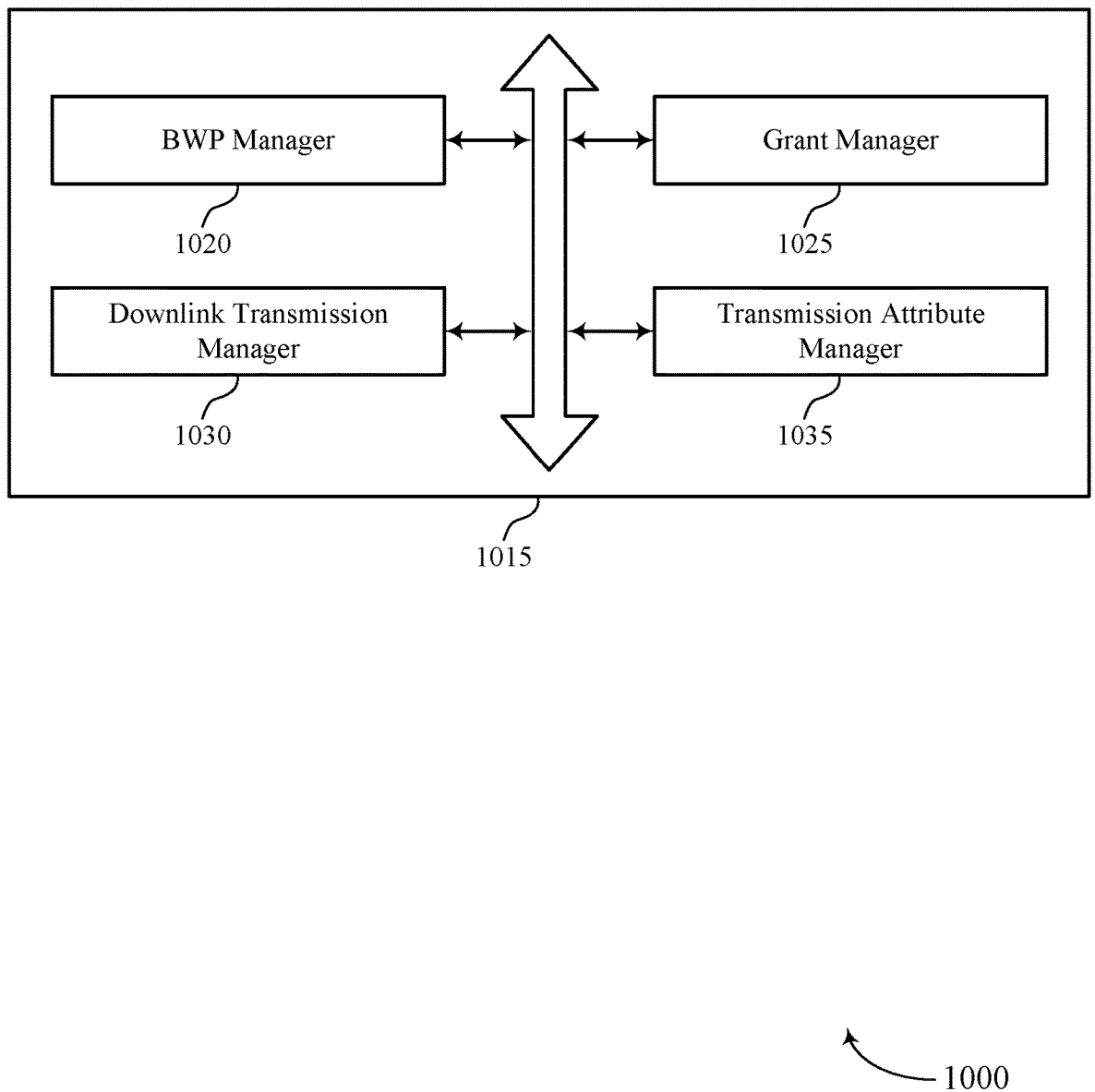
FIG. 10 shows a block diagram of a base station communications manager that supports FDM for BWP transmissions with mixed attributes in accordance with aspects of the present disclosure.

FIG. 10 shows a block diagram 1000 of a base station communications manager 1015 that supports FDM for BWP transmissions with mixed attributes in accordance with aspects of the present disclosure. The base station communications manager 1015 may be an example of aspects of a base station communications manager 1115 described with reference to FIGS. 8, 9, and 11. The base station communications manager 1015 may include BWP manager 1020, grant manager 1025, downlink transmission manager 1030, and transmission attribute manager 1035. Each of these modules may communicate, directly or indirectly, with one another (e.g., via one or more buses).

In some cases, the BWP manager 1020 may identify a configuration for a BWP of a carrier, the configuration including a first value for a transmission attribute for transmissions within the BWP.

Additionally or alternatively, the BWP manager 1020 may transmit, to a UE, a synchronization signal block for a carrier, the synchronization signal block associated with synchronization signal block transmission attributes. In some examples, the BWP manager 1020 may configure one or more BWP transmission attributes for transmissions within a BWP of the carrier. In some cases, the synchronization signal block transmission attributes include a first SCS and the one or more BWP transmission attributes include a second SCS. In some cases, the first SCS and the second SCS are different. In some cases, the one or more BWP transmission attributes include a transmission beam direction or a reception beam direction.

Grant manager 1025 may transmit a grant for a first downlink transmission in the BWP to a first UE, the first downlink transmission scheduled for a first set of resources that are overlapping in time with a SS block for the carrier, the SS block being transmitted using a second value for the transmission attribute.

Downlink transmission manager 1030 may transmit the first downlink transmission, where the transmitting includes applying the second value for the transmission attribute for at least a portion of the first set of resources.

Additionally or alternatively, the downlink transmission manager 1030 may transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block.

The transmission attribute manager 1035 may transmit a first downlink transmission, where the transmitting includes applying the first value for the transmission attribute for the first set of resources and inserting a guard band in the frequency domain between the first downlink transmission and the SS block. In some cases, the transmitting the first downlink transmission includes applying the second value for the transmission attribute for all of the first set of resources. In some cases, the transmitting the first downlink transmission includes applying the first value for the transmission attribute for a first portion of the first set of resources not overlapping in time with the SS block and the second value for the transmission attribute for a second portion of the first set of resources overlapping in time with the SS block. In some cases, the transmission attribute includes a SCS. In some cases, the transmission attribute includes a transmission beam direction or a reception beam direction. In some cases, the transmitting the first downlink transmission applying the first value for the transmission attribute for the first set of resources is based on a received capability message from the first UE indicating support for FDM of the first and second values for the transmission attribute. In some examples, transmission attribute manager 1035 may transmit a second downlink transmission to a second UE, the second downlink transmission overlapping in time with the first downlink transmission and not overlapping in time with the SS block. The transmitting the second downlink transmission may include inserting a guard band in the frequency domain between the first downlink transmission and the second downlink transmission.

Additionally or alternatively, the transmission attribute manager 1035 may transmit a second transmission to a second UE, the second transmission overlapping in time with the transmission and not overlapping in time with the synchronization signal block, where the transmitting the second transmission may include inserting a guard band in the frequency domain between the transmission and the second transmission.

Figure 11:
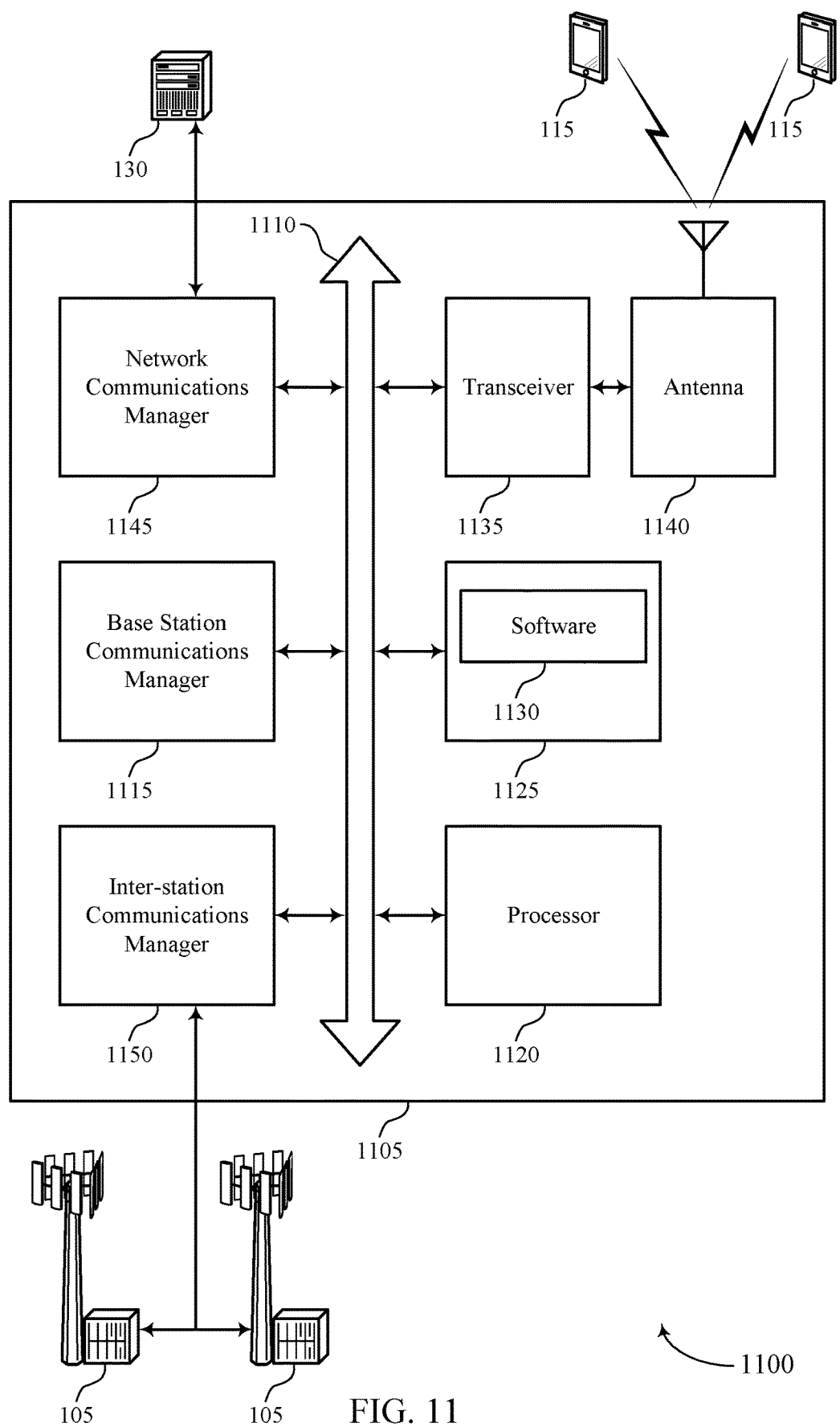
FIG. 11 illustrates a diagram of a system including a device that supports FDM for BWP transmissions with mixed attributes in accordance with aspects of the present disclosure.

FIG. 11 shows a diagram of a system 1100 including a device 1105 that supports FDM for BWP transmissions with mixed attributes in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting FDM for BWP transmissions with mixed attributes).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support FDM for BWP transmissions with mixed attributes. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 or XN interface within an LTE/LTE-A or NR wireless communication network technology to provide communication between base stations 105.

Figure 12:
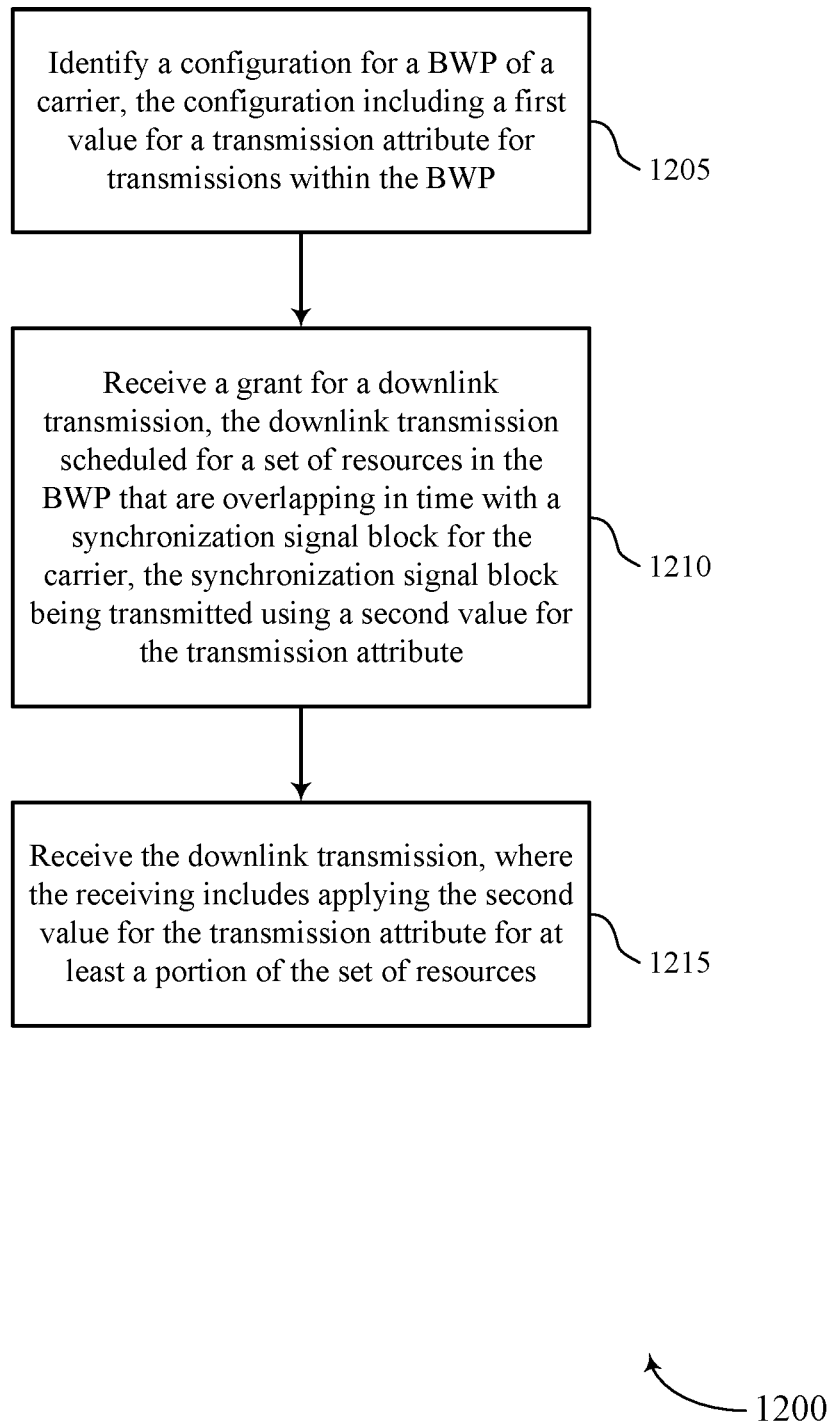
FIGS. 12 through 18 show flowcharts illustrating methods for FDM for BWP transmissions with mixed attributes in accordance with aspects of the present disclosure.

FIG. 12 shows a flowchart illustrating a method 1200 for FDM for BWP transmissions with mixed attributes in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205, the UE may identify a configuration for a BWP of a carrier, the configuration including a first value for a transmission attribute for transmissions within the BWP. In some cases, the transmission attribute may include a SCS, a transmission beam direction, and/or a reception beam direction. The operations of 1205 may be performed according to the methods described herein. In certain examples, aspects of the operations of 1205 may be performed by a BWP manager as described with reference to FIGS. 4 through 7.

At 1210, the UE may receive a grant for a downlink transmission, the downlink transmission scheduled for a set of resources in the BWP that are overlapping in time with a SS block for the carrier, the SS block being transmitted using a second value for the transmission attribute. The operations of 1210 may be performed according to the methods described herein. In certain examples, aspects of the operations of 1210 may be performed by a grant manager as described with reference to FIGS. 4 through 7.

At 1215, the UE may receive the downlink transmission, where the receiving includes applying the second value for the transmission attribute for at least a portion of the set of resources. In some cases, at 1215, the UE may apply the second value for the transmission attribute for all of the set of resources. In other cases, at 1215, the UE may apply the first value for the transmission attribute for a first portion of the set of resources not overlapping in time with the synchronization signal block and the second value for the transmission attribute for a second portion of the set of resources overlapping in time with the synchronization signal block. The operations of 1215 may be performed according to the methods described herein. In certain examples, aspects of the operations of 1215 may be performed by a transmission attribute manager as described with reference to FIGS. 4 through 7.

Figure 13:
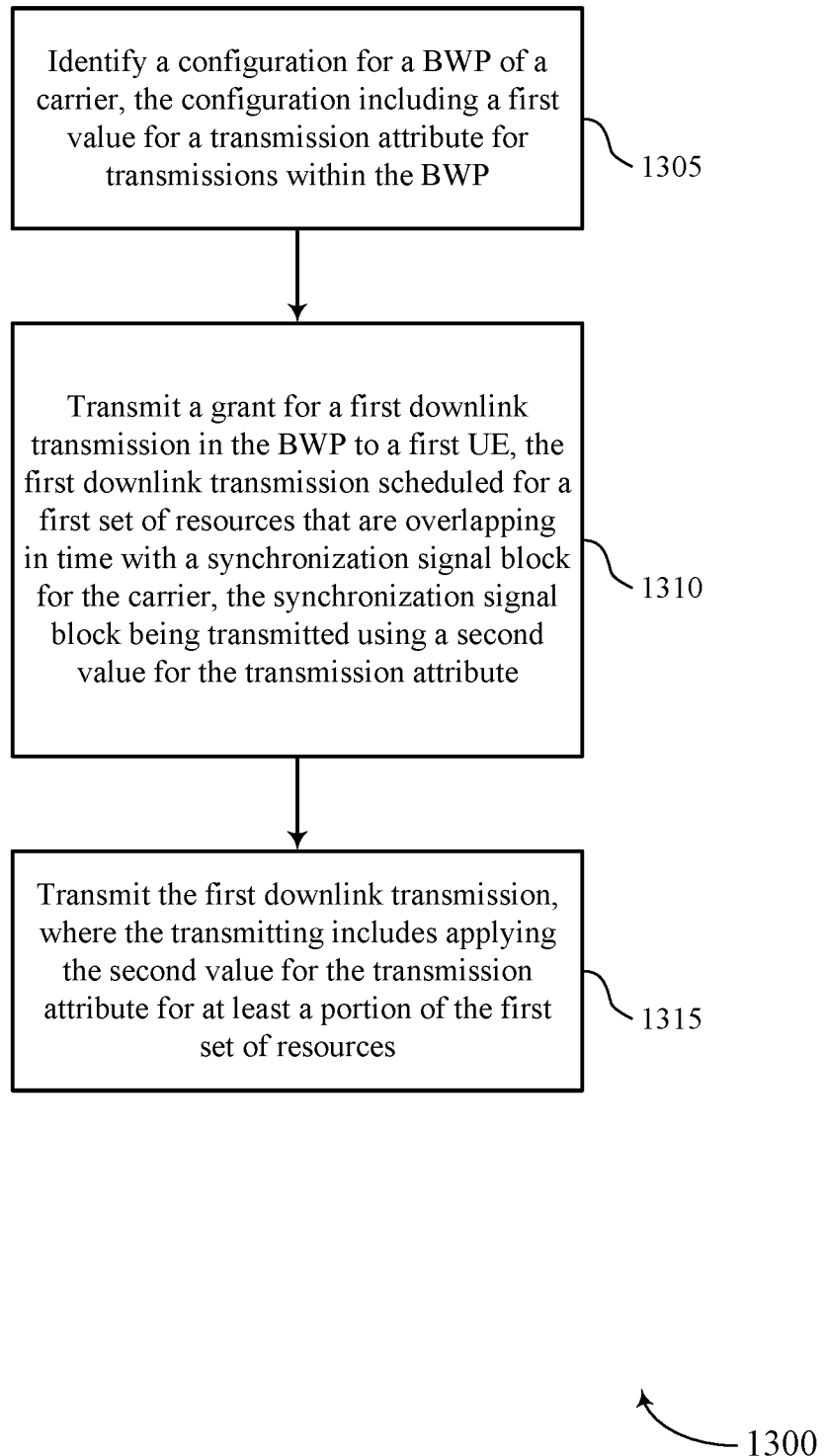

FIG. 13 shows a flowchart illustrating a method 1300 for FDM for BWP transmissions with mixed attributes in accordance with aspects of the present disclosure. The operations of method 1300 may be implemented by a base station 105 or its components as described herein. For example, the operations of method 1300 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1305, the base station may identify a configuration for a BWP of a carrier, the configuration including a first value for a transmission attribute for transmissions within the BWP. In some cases, the transmission attribute may include a SCS, a transmission beam direction, and/or a reception beam direction. The operations of 1305 may be performed according to the methods described herein. In certain examples, aspects of the operations of 1305 may be performed by a BWP manager as described with reference to FIGS. 8 through 11.

At 1310, the base station may transmit a grant for a first downlink transmission in the BWP to a first UE, the first downlink transmission scheduled for a first set of resources that are overlapping in time with a SS block for the carrier, the SS block being transmitted using a second value for the transmission attribute. The operations of 1310 may be performed according to the methods described herein. In certain examples, aspects of the operations of 1310 may be performed by a grant manager as described with reference to FIGS. 8 through 11.

At 1315, the base station may transmit the first downlink transmission, where the transmitting includes applying the second value for the transmission attribute for at least a portion of the first set of resources. In some examples, at 1315, the base station may apply the second value for the transmission attribute for all of the first set of resources. In some examples, at 1315, the base station may apply the first value for the transmission attribute for a first portion of the first set of resources not overlapping in time with the synchronization signal block and the second value for the transmission attribute for a second portion of the first set of resources overlapping in time with the synchronization signal block. The operations of 1315 may be performed according to the methods described herein. In certain examples, aspects of the operations of 1315 may be performed by a downlink transmission manager as described with reference to FIGS. 8 through 11.

Figure 14:
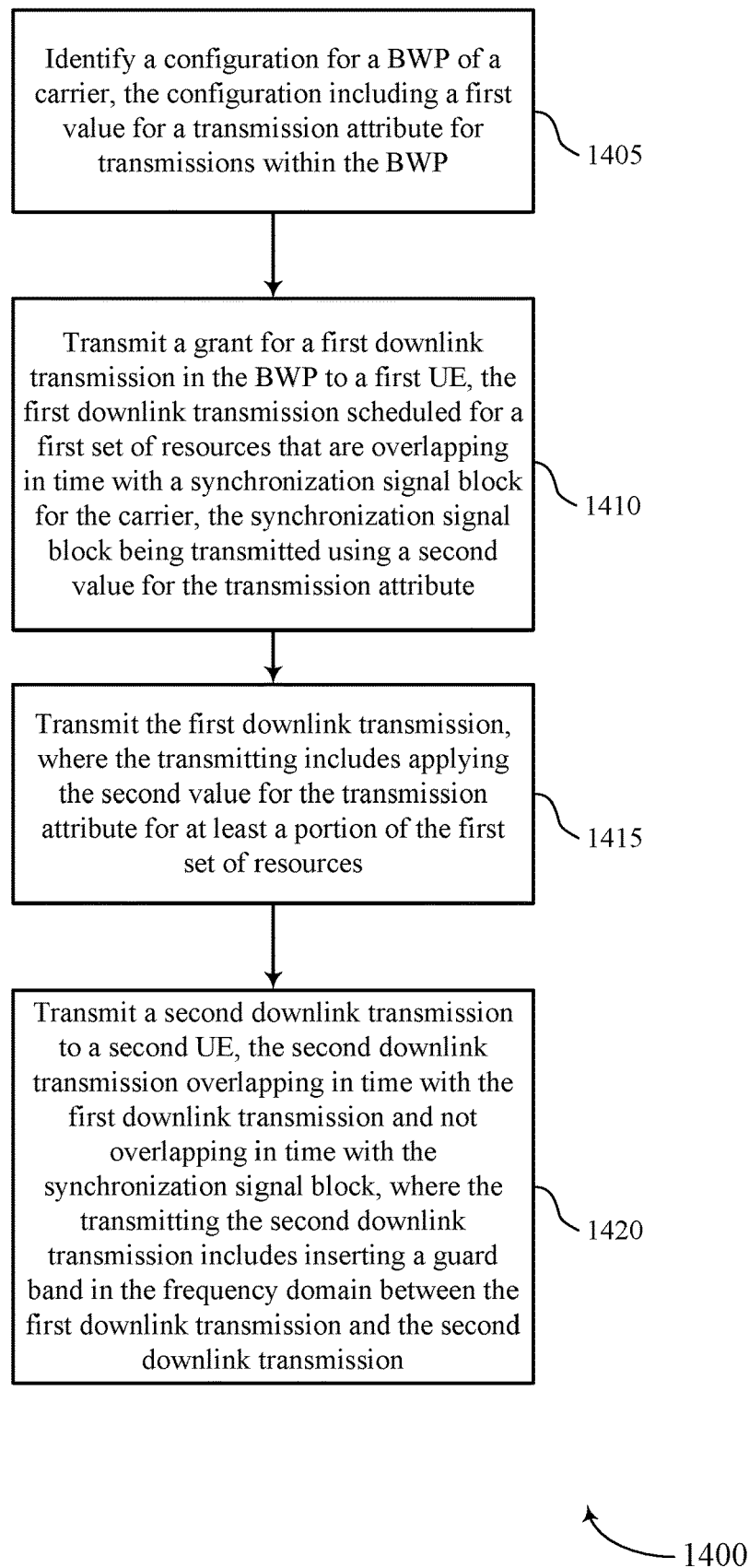

FIG. 14 shows a flowchart illustrating a method 1400 for FDM for BWP transmissions with mixed attributes in accordance with aspects of the present disclosure. The operations of method 1400 may be implemented by a base station 105 or its components as described herein. For example, the operations of method 1400 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1405, the base station may identify a configuration for a BWP of a carrier, the configuration including a first value for a transmission attribute for transmissions within the BWP. The operations of 1405 may be performed according to the methods described herein. In certain examples, aspects of the operations of 1405 may be performed by a BWP manager as described with reference to FIGS. 8 through 11.

At 1410, the base station may transmit a grant for a first downlink transmission in the BWP to a first UE, the first downlink transmission scheduled for a first set of resources that are overlapping in time with a SS block for the carrier, the SS block being transmitted using a second value for the transmission attribute. The operations of 1410 may be performed according to the methods described herein. In certain examples, aspects of the operations of 1410 may be performed by a grant manager as described with reference to FIGS. 8 through 11.

At 1415, the base station may transmit the first downlink transmission, where the transmitting includes applying the second value for the transmission attribute for at least a portion of the first set of resources. The operations of 1415 may be performed according to the methods described herein. In certain examples, aspects of the operations of 1415 may be performed by a downlink transmission manager as described with reference to FIGS. 8 through 11.

At 1420, the base station may transmit a second downlink transmission to a second UE, the second downlink transmission overlapping in time with the first downlink transmission and not overlapping in time with the SS block, where the transmitting the second downlink transmission includes inserting a guard band in the frequency domain between the first downlink transmission and the second downlink transmission. The operations of 1420 may be performed according to the methods described herein. In certain examples, aspects of the operations of 1420 may be performed by a transmission attribute manager as described with reference to FIGS. 8 through 11.

In some cases, the transmitting the first downlink transmission includes applying the second value for the transmission attribute for all of the first set of resources.

Figure 15:
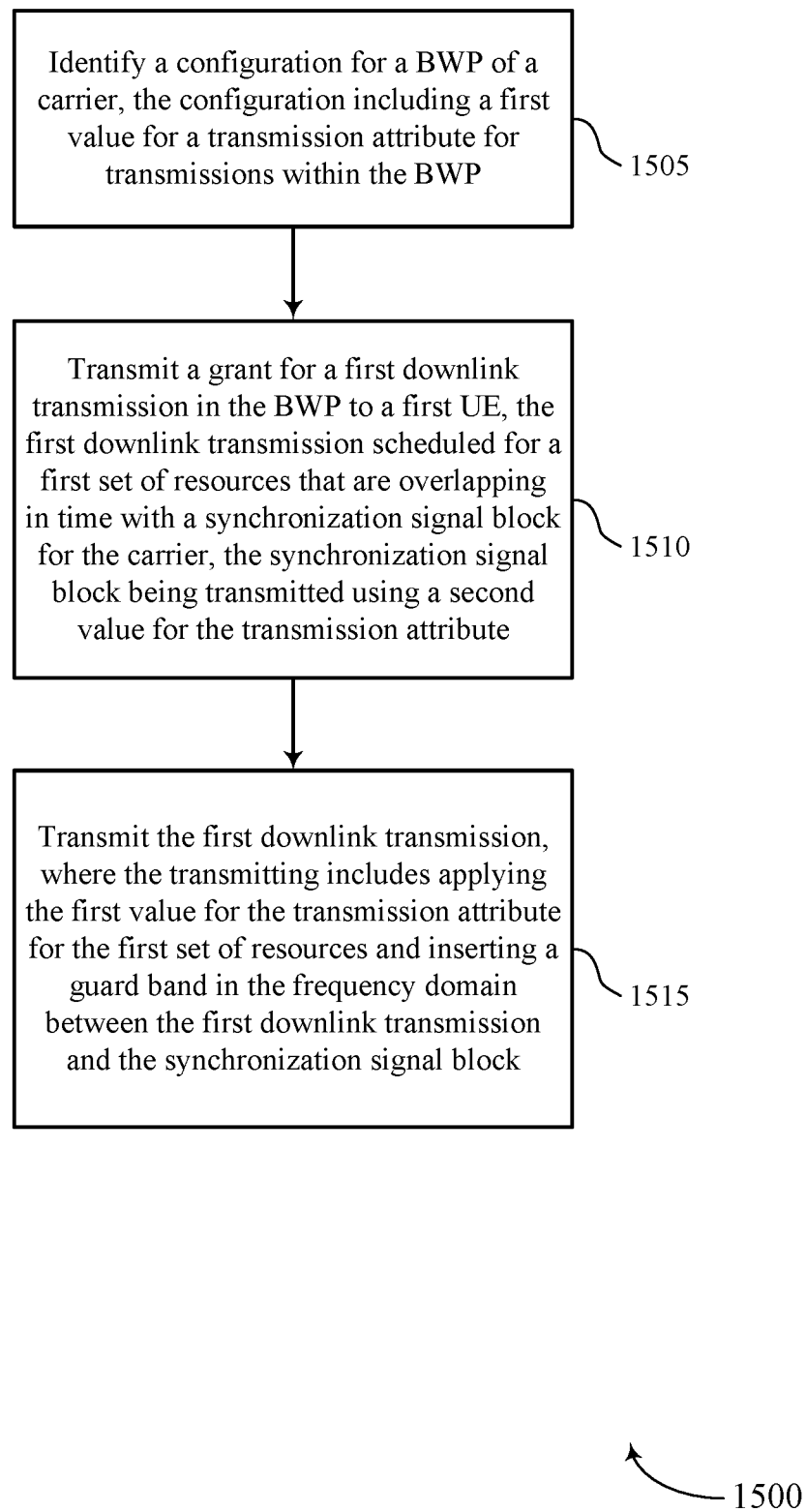

FIG. 15 shows a flowchart illustrating a method 1500 for FDM for BWP transmissions with mixed attributes in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1505, the base station may identify a configuration for a BWP of a carrier, the configuration including a first value for a transmission attribute for transmissions within the BWP. The operations of 1505 may be performed according to the methods described herein. In certain examples, aspects of the operations of 1505 may be performed by a BWP manager as described with reference to FIGS. 8 through 11.

At 1510, the base station may transmit a grant for a first downlink transmission in the BWP to a first UE, the first downlink transmission scheduled for a first set of resources that are overlapping in time with a SS block for the carrier, the SS block being transmitted using a second value for the transmission attribute. The operations of 1510 may be performed according to the methods described herein. In certain examples, aspects of the operations of 1510 may be performed by a grant manager as described with reference to FIGS. 8 through 11.

At 1515, the base station may transmit the first downlink transmission, where the transmitting includes applying the first value for the transmission attribute for the first set of resources and inserting a guard band in the frequency domain between the first downlink transmission and the SS block. In some examples, at 1515, the base station may transmit the first downlink transmission applying the first value for the transmission attribute for the first set of resources based on a received capability message from the first UE indicating support for FDM of the first and second values for the transmission attribute. The operations of 1515 may be performed according to the methods described herein. In certain examples, aspects of the operations of 1515 may be performed by a transmission attribute manager as described with reference to FIGS. 8 through 11.

Figure 16:
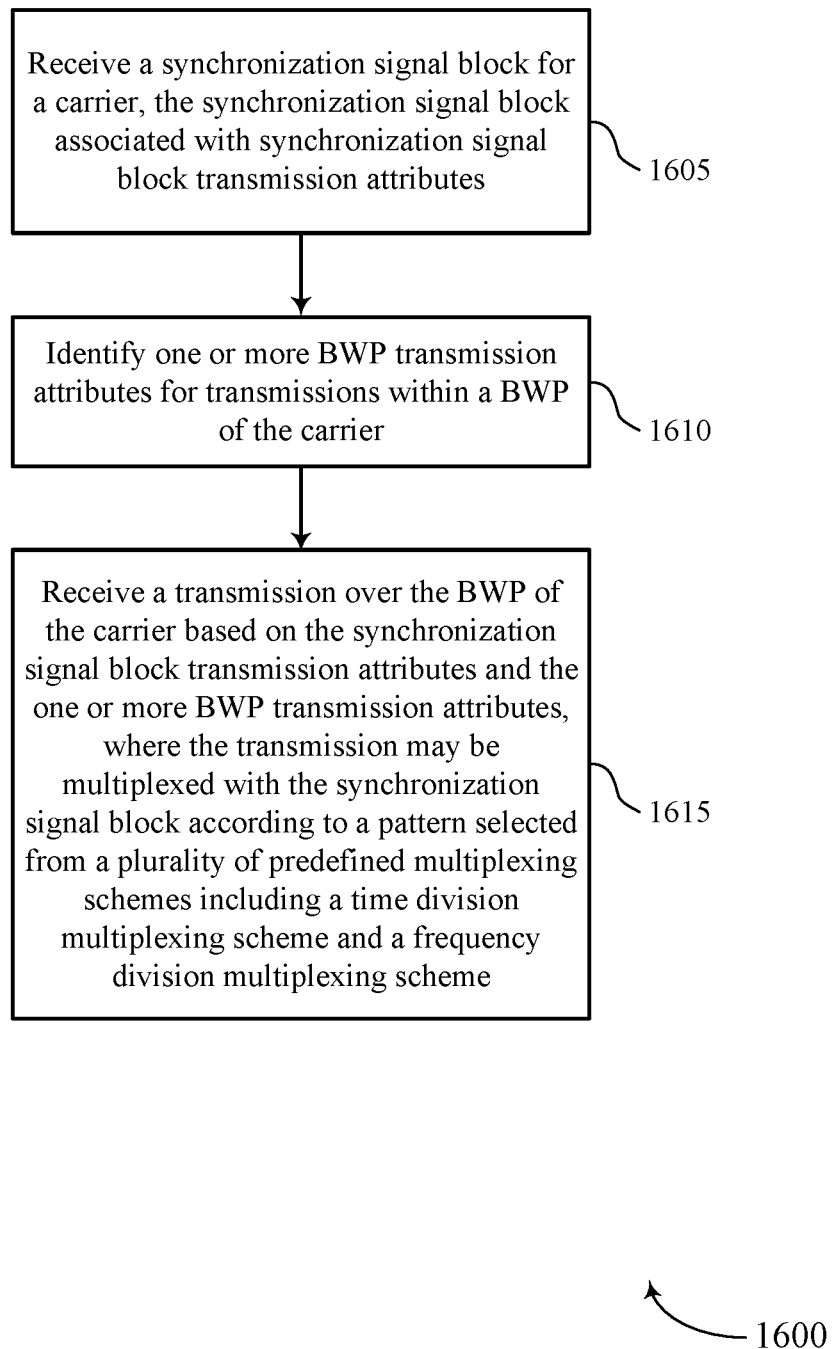

FIG. 16 shows a flowchart illustrating a method 1600 for FDM for BWP transmissions with mixed attributes in accordance with aspects of the present disclosure. The operations of method 1600 may be implemented by a UE 115 or its components as described herein. For example, the operations of method 1600 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1605, the UE may receive a synchronization signal block for a carrier, the synchronization signal block associated with synchronization signal block transmission attributes. In one example, synchronization signal block transmission attributes associated with the synchronization signal block transmission are detected implicitly, as the UE searches for the synchronization signal block. The operations of 1605 may be performed according to the methods described herein. In certain examples, aspects of the operations of 1605 may be performed by a BWP manager as described with reference to FIGS. 4 through 7.

At 1610, the UE may identify one or more BWP transmission attributes for transmissions within a BWP of the carrier. The UE may identify the one or more BWP transmission attributes based on a BWP configuration that may be determined by the UE, for example, from a PBCH payload included as a part of the transmitted synchronization signal block. As such, the BWP transmission attributes can be identified based on a signal, such as the synchronization signal block transmission. The operations of 1610 may be performed according to the methods described herein. In certain examples, aspects of the operations of 1610 may be performed by a BWP manager as described with reference to FIGS. 4 through 7.

At 1615, the UE may receive a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme. The operations of 1615 may be performed according to the methods described herein. In certain examples, aspects of the operations of 1615 may be performed by a transmission attribute manager as described with reference to FIGS. 4 through 7.

Figure 17:
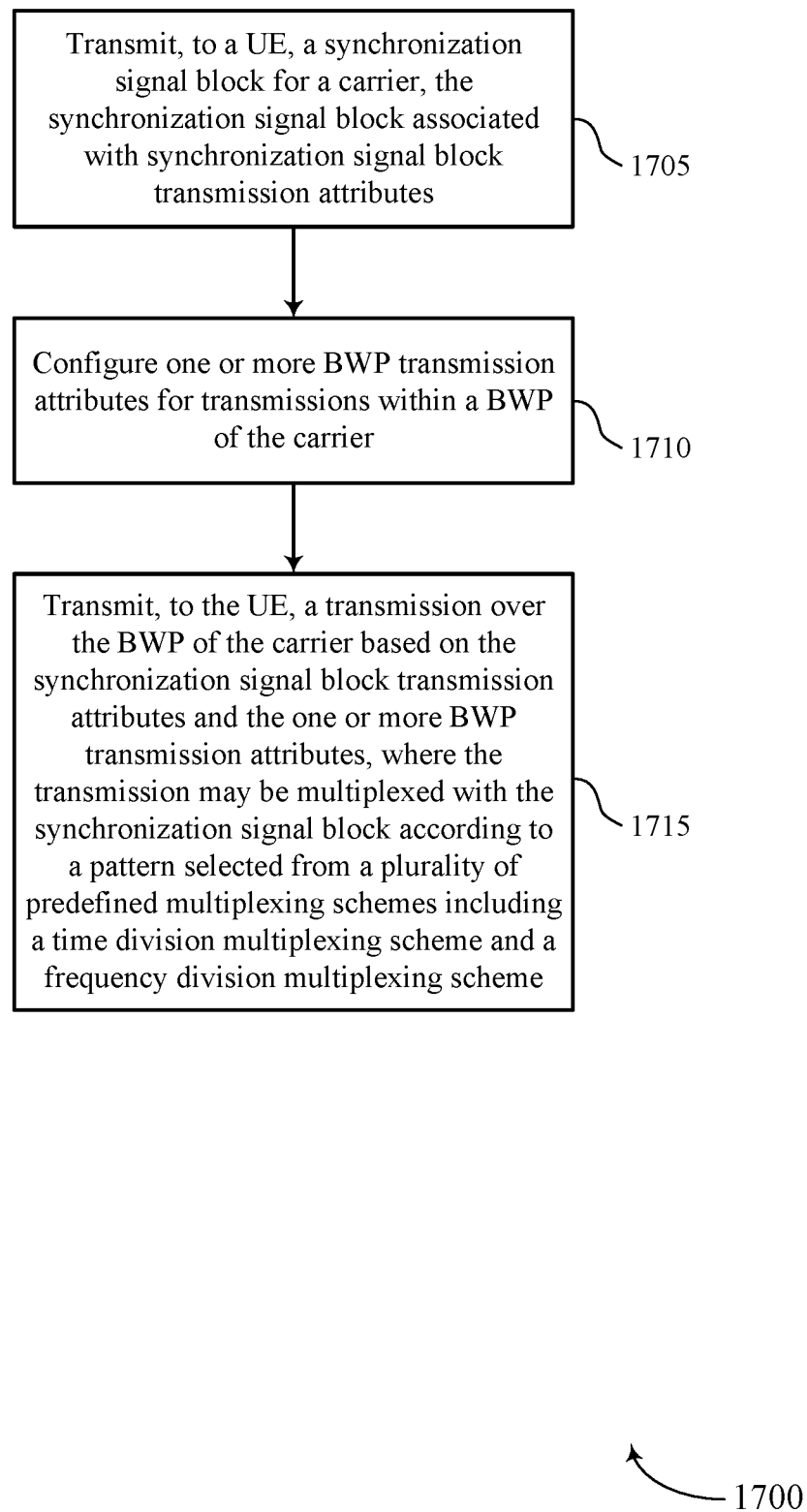

FIG. 17 shows a flowchart illustrating a method 1700 for FDM for BWP transmissions with mixed attributes in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1705, the base station may transmit, to a UE, a synchronization signal block for a carrier, the synchronization signal block associated with synchronization signal block transmission attributes. The operations of 1705 may be performed according to the methods described herein. In certain examples, aspects of the operations of 1705 may be performed by a BWP manager as described with reference to FIGS. 8 through 11.

At 1710, the base station may configure one or more BWP transmission attributes for transmissions within a BWP of the carrier. The operations of 1710 may be performed according to the methods described herein. In certain examples, aspects of the operations of 1705 may be performed by a BWP manager as described with reference to FIGS. 8 through 11.

At 1715, the base station may transmit, to the UE, a transmission over the BWP of the carrier based on the synchronization signal block transmission attributes and the one or more BWP transmission attributes, where the transmission may be multiplexed with the synchronization signal block according to a pattern selected from a plurality of predefined multiplexing schemes including a time division multiplexing scheme and a frequency division multiplexing scheme. The operations of 1715 may be performed according to the methods described herein. In certain examples, aspects of the operations of 1715 may be performed by a downlink transmission manager as described with reference to FIGS. 8 through 11.

Figure 18:
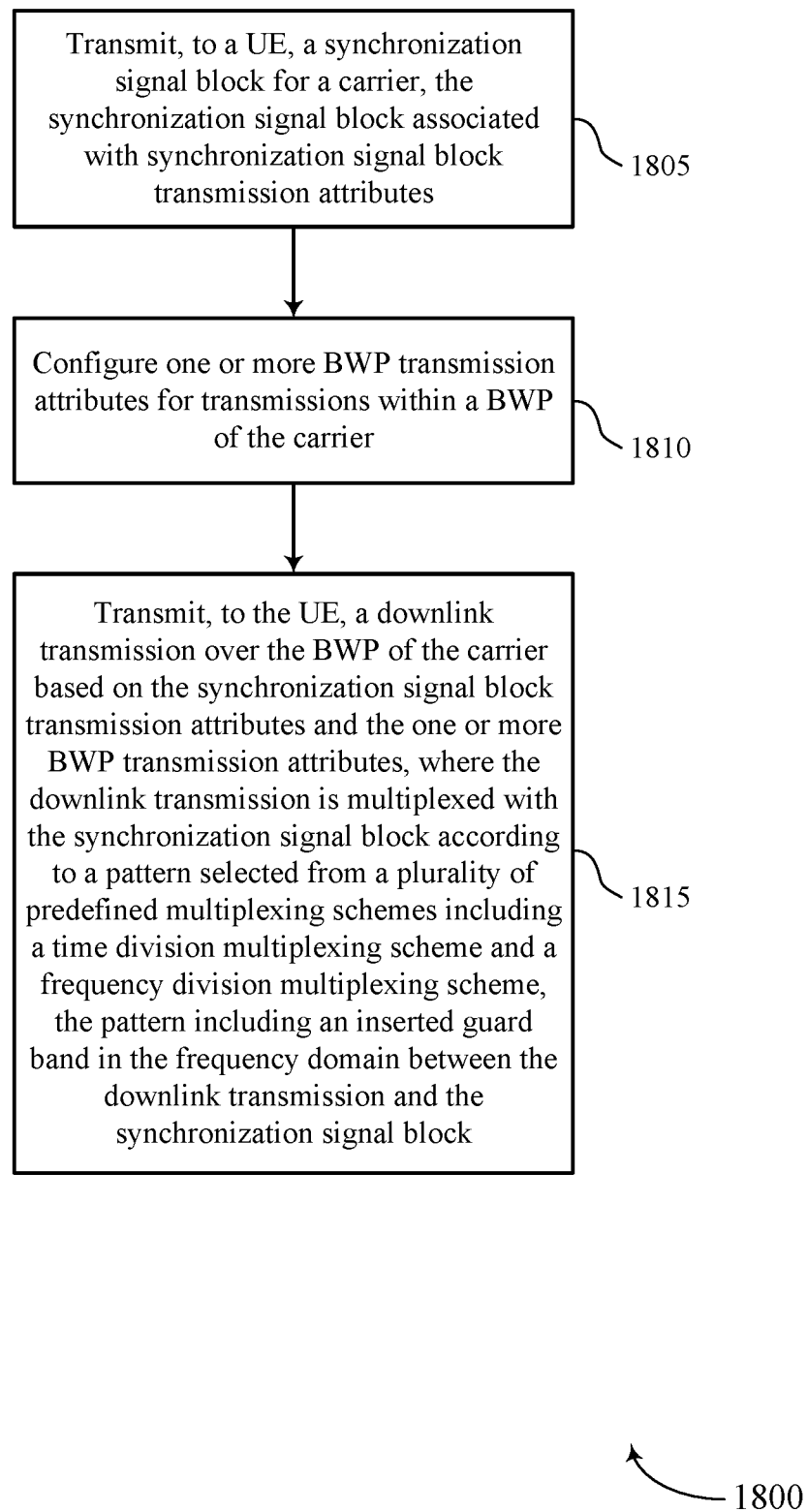

FIG. 18 shows a flowchart illustrating a method 1800 for FDM for BWP transmissions with mixed attributes in accordance with aspects of the present disclosure. The operations of method 1800 may be implemented by a base station 105 or its components as described herein. For example, the operations of method 1800 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1805, the base station may transmit, to a UE, a synchronization signal block for a carrier, the synchronization signal block associated with synchronization signal block transmission attributes. The operations of 1805 may be performed according to the methods described herein. In certain examples, aspects of the operations of 1805 may be performed by a BWP manager as described with reference to FIGS. 8 through 11.

At 1810, the base station may configure one or more BWP transmission attributes for transmissions within a BWP of the carrier. The operations of 1810 may be performed according to the methods described herein. In certain examples, aspects of the operations of 1805 may be performed by a BWP manager as described with reference to FIGS. 8 through 11.

At 1815, the base station may transmit, to the UE, a downlink transmission over the BWP of the carrier based on the synchronization signal block transmission attributes and the one or more BWP transmission attributes, where the downlink transmission is multiplexed with the synchronization signal block according to a pattern selected from a plurality of predefined multiplexing schemes including a time division multiplexing scheme and a frequency division multiplexing scheme, the pattern including an inserted guard band in the frequency domain between the downlink transmission and the synchronization signal block. The operations of 1815 may be performed according to the methods described herein. In certain examples, aspects of the operations of 1815 may be performed by a downlink transmission manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a synchronization signal block for a carrier, the synchronization signal block associated with synchronization signal block transmission attributes comprising a first subcarrier spacing (SCS);
    identifying one or more bandwidth part (BWP) transmission attributes for transmissions within a BWP of the carrier, wherein the one or more BWP transmission attributes comprise a second SCS, the second SCS being one of a plurality of SCS values; and
    receiving a transmission over the BWP of the carrier based at least in part on the second SCS and receiving the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

2. The method of claim 1, wherein the transmission comprises a downlink control channel transmission.

3. The method of claim 1, wherein the transmission comprises a downlink shared channel transmission.

4. The method of claim 1, wherein the first SCS and the second SCS are different.

5. The method of claim 1, wherein the one or more BWP transmission attributes comprise a transmission beam direction or a reception beam direction.

6. The method of claim 1, wherein the one or more BWP transmission attributes are identified based at least in part on a signal received from the carrier.

7. A method for wireless communication, comprising:
transmitting, to a user equipment (UE), a synchronization signal block for a carrier, the synchronization signal block associated with synchronization signal block transmission attributes comprising a first subcarrier spacing (SCS);
configuring one or more bandwidth part (BWP) transmission attributes for transmissions within a BWP of the carrier, wherein the one or more BWP transmission attributes comprise a second SCS, the second SCS being one of a plurality of SCS values; and
transmitting, to the UE, a transmission over the BWP of the carrier based at least in part on the second SCS and transmitting the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

8. The method of claim 7, wherein the transmission comprises a downlink control channel transmission.

9. The method of claim 7, wherein the transmission comprises a downlink shared channel transmission.

10. The method of claim 7, further comprising:
transmitting a second transmission to a second UE, the second transmission overlapping in time with the transmission and not overlapping in time with the synchronization signal block, wherein the transmitting the second transmission comprises inserting a guard band in frequency domain between the transmission and the second transmission.

11. The method of claim 7, wherein the first SCS and the second SCS are different.

12. The method of claim 7, wherein the one or more BWP transmission attributes comprise a transmission beam direction or a reception beam direction.

13. A method for wireless communication, comprising:
transmitting, to a user equipment (UE), a synchronization signal block for a carrier, the synchronization signal block associated with synchronization signal block transmission attributes;
configuring one or more bandwidth part (BWP) transmission attributes for transmissions within a BWP of the carrier; and
transmitting, to the UE, a downlink transmission over the BWP of the carrier based at least in part on the synchronization signal block transmission attributes and the one or more BWP transmission attributes, wherein the downlink transmission is multiplexed with the synchronization signal block according to a pattern selected from a plurality of predefined multiplexing schemes comprising a time division multiplexing scheme and a frequency division multiplexing scheme, the pattern including an inserted guard band in frequency domain between the downlink transmission and the synchronization signal block.

14. The method of claim 13, wherein the synchronization signal block transmission attributes comprise a first subcarrier spacing (SCS) and the one or more BWP transmission attributes comprise a second SCS.

15. The method of claim 14, wherein the first SCS and the second SCS are different.

16. The method of claim 13, wherein the one or more BWP transmission attributes comprise a transmission beam direction or a reception beam direction.

17. An apparatus for wireless communication at a user equipment (UE), comprising:
a processor,
memory in electronic communication with the processor; and
instructions stored in the memory and executable by the processor to cause the apparatus to:
receive a synchronization signal block for a carrier, the synchronization signal block associated with synchronization signal block transmission attributes comprising a first subcarrier spacing (SCS);
identify one or more bandwidth part (BWP) transmission attributes for transmissions within a BWP of the carrier, wherein the one or more BWP transmission attributes comprise a second SCS, the second SCS being one of a plurality of SCS values; and
receive a transmission over the BWP of the carrier based at least in part on the second SCS and receiving the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

18. The apparatus of claim 17, wherein the transmission comprises a downlink control channel transmission.

19. The apparatus of claim 17, wherein the transmission comprises a downlink shared channel transmission.

20. The apparatus of claim 17, wherein the first SCS and the second SCS are different.

21. The apparatus of claim 17, wherein the BWP one or more transmission attributes comprise a transmission beam direction or a reception beam direction.

22. The apparatus of claim 17, wherein the one or more BWP transmission attributes are identified based at least in part on a signal received from the carrier.

23. An apparatus for wireless communication, comprising:
a processor,
memory in electronic communication with the processor; and
instructions stored in the memory and executable by the processor to cause the apparatus to:

transmit, to a user equipment (UE), a synchronization signal block for a carrier, the synchronization signal block associated with synchronization signal block transmission attributes comprising a first subcarrier spacing (SCS);
configure one or more bandwidth part (BWP) transmission attributes for transmissions within a BWP of the carrier, wherein the one or more BWP transmission attributes comprise a second SCS, the second SCS being one of a plurality of SCS values; and
transmit, to the UE, a transmission over the BWP of the carrier based at least in part on the second SCS and transmitting the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

24. The apparatus of claim 23, wherein the transmission comprises a downlink control channel transmission.

25. The apparatus of claim 23, wherein the transmission comprises a downlink shared channel transmission.

26. The apparatus of claim 23, wherein the instructions are further executable by the processor to cause the apparatus to:
the instructions to transmit a second transmission to a second UE, the second transmission overlapping in time with the transmission and not overlapping in time with the synchronization signal block, wherein the transmitting the second transmission comprises inserting a guard band in frequency domain between the transmission and the second transmission.

27. The apparatus of claim 23, wherein the first SCS and the second SCS are different.

28. The apparatus of claim 23, wherein the one or more BWP transmission attributes comprise a transmission beam direction or a reception beam direction.

29. An apparatus for wireless communication, comprising:
a processor,
memory in electronic communication with the processor; and
instructions stored in the memory and executable by the processor to cause the apparatus to:
transmit, to a user equipment (UE), a synchronization signal block for a carrier, the synchronization signal block associated with synchronization signal block transmission attributes;
configure one or more bandwidth part (BWP) transmission attributes for transmissions within a BWP of the carrier; and
transmit, to the UE, a downlink transmission over the BWP of the carrier based at least in part on the synchronization signal block transmission attributes and the one or more BWP transmission attributes, wherein the downlink transmission is multiplexed with the synchronization signal block according to a pattern selected from a plurality of predefined multiplexing schemes comprising a time division multiplexing scheme and a frequency division multiplexing scheme, the pattern including an inserted guard band in frequency domain between the downlink transmission and the synchronization signal block.

30. The apparatus of claim 28, wherein the synchronization signal block transmission attributes comprise a first subcarrier spacing (SCS) and the one or more BWP transmission attributes comprise a second SCS.

31. The apparatus of claim 30, wherein the first SCS and the second SCS are different.

32. The apparatus of claim 28, wherein the one or more BWP transmission attributes comprise a transmission beam direction or a reception beam direction.

33. An apparatus for wireless communication at a user equipment (UE), comprising:
means for receiving a synchronization signal block for a carrier, the synchronization signal block associated with synchronization signal block transmission attributes comprising a first subcarrier spacing (SCS);
means for identifying one or more bandwidth part (BWP) transmission attributes for transmissions within a BWP of the carrier, wherein the one or more BWP transmission attributes comprise a second SCS, the second SCS being one of a plurality of SCS values; and
means for receiving a transmission over the BWP of the carrier based at least in part on the second SCS and receiving the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

34. An apparatus for wireless communication, comprising:
means for transmitting, to a user equipment (UE), a synchronization signal block for a carrier, the synchronization signal block associated with synchronization signal block transmission attributes comprising a first subcarrier spacing (SCS);
means for configuring one or more bandwidth part (BWP) transmission attributes for transmissions within a BWP of the carrier, wherein the one or more BWP transmission attributes comprise a second SCS, the second SCS being one of a plurality of SCS values; and
means for transmitting, to the UE, a transmission over the BWP of the carrier based at least in part on the second SCS and transmitting the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

35. An apparatus for wireless communication, comprising:
means for transmitting, to a user equipment (UE), a synchronization signal block for a carrier, the synchronization signal block associated with synchronization signal block transmission attributes;

means for configuring one or more bandwidth part (BWP) transmission attributes for transmissions within a BWP of the carrier; and means for transmitting, to the UE, a downlink transmission over the BWP of the carrier based at least in part on the synchronization signal block transmission attributes and the one or more BWP transmission attributes, wherein the downlink transmission is multiplexed with the synchronization signal block according to a pattern selected from a plurality of predefined multiplexing schemes comprising a time division multiplexing scheme and a frequency division multiplexing scheme, the pattern including an inserted guard band in frequency domain between the downlink transmission and the synchronization signal block.

36. A non-transitory computer-readable medium storing code for wireless communication at a user equipment (UE), the code comprising instructions executable by a processor to:

receive a synchronization signal block for a carrier, the synchronization signal block associated with synchronization signal block transmission attributes comprising a first subcarrier spacing (SCS);

identify one or more bandwidth part (BWP) transmission attributes for transmissions within a BWP of the carrier, wherein the one or more BWP transmission attributes comprise a second SCS, the second SCS being one of a plurality of SCS values; and receive a transmission over the BWP of the carrier based at least in part on the second SCS and receiving the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

37. A non-transitory computer-readable medium storing code for wireless communication, the code comprising instructions executable by a processor to:

transmit, to a user equipment (UE), a synchronization signal block for a carrier, the synchronization signal block associated with synchronization signal block transmission attributes comprising a first subcarrier spacing (SCS);

configure one or more bandwidth part (BWP) transmission attributes for transmissions within a BWP of the carrier, wherein the one or more BWP transmission attributes comprise a second SCS, the second SCS being one of a plurality of SCS values; and transmit, to the UE, a transmission over the BWP of the carrier based at least in part on the second SCS and transmitting the synchronization signal block using the first SCS, wherein the transmission is multiplexed with the synchronization signal block according to a pattern selected from a plurality of predefined multiplexing schemes comprising a time division multiplexing scheme and a frequency division multiplexing scheme, and wherein respective ones of the plurality of predefined multiplexing schemes are associated with respective ones of the plurality of SCS values for the second SCS.

38. The non-transitory computer-readable medium storing code for wireless communication, the code comprising instructions executable by a processor to:

transmit, to a user equipment (UE), a synchronization signal block for a carrier, the synchronization signal block associated with synchronization signal block transmission attributes;

configure one or more bandwidth part (BWP) transmission attributes for transmissions within a BWP of the carrier; and transmit, to the UE, a downlink transmission over the BWP of the carrier based at least in part on the synchronization signal block transmission attributes and the one or more BWP transmission attributes, wherein the downlink transmission is multiplexed with the synchronization signal block according to a pattern selected from a plurality of predefined multiplexing schemes comprising a time division multiplexing scheme and a frequency division multiplexing scheme, the pattern including an inserted guard band in frequency domain between the downlink transmission and the synchronization signal block.

* * * * *